(12) United States Patent
Colon et al.

(10) Patent No.: US 10,887,286 B1
(45) Date of Patent: Jan. 5, 2021

(54) DEVICES, SYSTEMS, AND METHODS FOR TENANT-TO-TENANT COMMUNICATIONS

(71) Applicants: Luis Alfonso Colon, Denver, CO (US); Melanie JaJae Colon, Denver, CO (US)

(72) Inventors: Luis Alfonso Colon, Denver, CO (US); Melanie JaJae Colon, Denver, CO (US)

(73) Assignee: Apt. App LLC, Edgewater, CO (US)

( * ) Notice: Subject to any disclaimer, the term of this patent is extended or adjusted under 35 U.S.C. 154(b) by 0 days.

(21) Appl. No.: 15/873,238

(22) Filed: Jan. 17, 2018

Related U.S. Application Data

(60) Provisional application No. 62/447,162, filed on Jan. 17, 2017.

(51) Int. Cl.
*H04L 29/06* (2006.01)
*H04L 12/58* (2006.01)

(52) U.S. Cl.
CPC ........ *H04L 63/0421* (2013.01); *H04L 51/063* (2013.01); *H04L 51/28* (2013.01); *H04L 65/1069* (2013.01)

(58) Field of Classification Search
CPC ......... H04L 51/20; H04L 51/28; H04L 51/32; H04L 51/063; H04L 63/0421; H04L 65/1069; H04W 4/12; H04W 4/21
See application file for complete search history.

(56) References Cited

U.S. PATENT DOCUMENTS

| | | | |
|---|---|---|---|
| 8,364,115 | B2 | 1/2013 | Blair et al. |
| 8,548,423 | B2 | 10/2013 | Rao |
| 8,711,737 | B2 | 4/2014 | Kandekar et al. |
| 8,782,560 | B2 | 7/2014 | Purdy |
| 8,918,133 | B2 | 12/2014 | Rao |
| 9,046,987 | B2 | 6/2015 | Kandekar et al. |
| 9,071,579 | B1 | 6/2015 | Bender |
| 2012/0063367 | A1 | 3/2012 | Curtis |
| 2012/0066067 | A1 | 3/2012 | Curtis |
| 2012/0303727 | A1 | 11/2012 | Spat |
| 2012/0317205 | A1 | 12/2012 | Lahiani et al. |

(Continued)

*Primary Examiner* — Nicholas R Taylor
*Assistant Examiner* — Michael Li
(74) *Attorney, Agent, or Firm* — Red Rocks Law, LLC

(57) ABSTRACT

Various embodiments of devices, systems, and methods for anonymous tenant-to-tenant communications provide for anonymously sending and receiving messages between tenants or residents of a dwelling such as an apartment complex or other residence. A communications engine may operate on a server and act as a message relay device and data storage source, to provide anonymous messaging between tenants. Identity information is not shared as part of message transmissions between the tenants, and a tenant is not required to have the contact information of their neighbors to communicate when utilizing embodiments of the present disclosure. In one example, mobile computing devices are provided with a graphical user interface with a display of a plurality of adjacent apartment units for a user to select and a graphical user interface with a display of a plurality of fixed messages for transmission to one or more tenants associated with a selected adjacent apartment unit.

19 Claims, 30 Drawing Sheets

(56) References Cited

U.S. PATENT DOCUMENTS

| | | |
|---|---|---|
| 2013/0185368 A1* | 7/2013 | Nordstrom .............. H04W 4/21 |
| | | 709/206 |
| 2014/0289679 A1 | 9/2014 | Purdy |
| 2014/0379803 A1 | 12/2014 | Strand |
| 2015/0058957 A1 | 2/2015 | Halliday et al. |
| 2015/0304300 A1* | 10/2015 | Bender .............. H04L 12/1895 |
| | | 726/4 |
| 2016/0127291 A1 | 5/2016 | Kassab et al. |

\* cited by examiner

FIG. 23

Mobile Computing Device

DEVICES, SYSTEMS, AND METHODS FOR TENANT-TO-TENANT COMMUNICATIONS

CROSS-REFERENCE TO RELATED APPLICATION

This application claims under 35 U.S.C. 119(e) priority to and the benefit of U.S. Provisional Patent Application No. 62/447,162 filed Jan. 17, 2017 entitled "Devices, Systems, and Methods for Tenant-to-Tenant Communications" the disclosure of which is hereby incorporated by reference in its entirety.

FIELD

This disclosure relates, in general, to communications systems, and more particularly to anonymous communications systems and devices.

BACKGROUND

In apartment complexes, student housing, military housing, hotels, and other multi-unit dwellings or multi-unit residences such as with multiple floors and units, when issues arise such as noise complaints or other issues, a tenant living in the apartment complex can approach their neighbor's apartment unit where the issue is arising from and ask their neighbor to reduce the noise level or otherwise resolve the issue.

However, such a scenario requires that the person directly approach their neighbor's apartment or that the person have the contact information for each of their neighbors in order to contact them via telephone, email or text message. As recognized by the present inventors, this conventionally may require that each residence of an apartment complex obtain and store on their mobile phone or computers, the contact information of each of their neighbors. Such a requirement can be time-consuming and may require large amounts of data to be maintained on each of the resident's mobile phones or computers. In addition, as neighbors move out of the apartment complex and new neighbors move into the apartment complex, it can be difficult for residents to update and accurately maintain the contact information of their neighbors in the apartment building.

As recognized by the present inventors, what is needed are devices, systems, and methods for anonymous tenant-to-tenant communications.

SUMMARY

In light of the above, disclosed herein are various embodiments of devices, systems, and methods for anonymous tenant-to-tenant communications. As described herein, embodiments of the present disclosure provide for anonymously sending and receiving messages between tenants or residents of a dwelling such as an apartment complex or other residence. In one example, a communications engine may operate on a server and may act as a message relay device and data storage source, to provide anonymous messaging between tenants. Identity information is not shared as part of message transmissions between the tenants, and a tenant is not required to have the contact information of their neighbors in order to communicate when utilizing embodiments of the present disclosure. Message content is preferably selectable from a set of predetermined or fixed messages, so as to provide messages that have standardized content, which can be useful in reducing conflicts when the messages relate to complaints such as noise complaints or other complaints. In one example, management of the apartment complex is made aware of the communications between tenants including notifications regarding the complaints as well as resolutions communicated relating to such complaints or messages.

According to another broad aspect of another embodiment of the present disclosure, disclosed herein is a computer-implemented method for anonymous communications between a first tenant computing device corresponding to a first tenant of an apartment complex residing in a first apartment unit, and other tenant computing devices corresponding to other tenants residing in other apartment units. In one example, the method may include storing in a database one or more items of contact information for the first tenant and other tenants; associating in the database the items of contact information of the first tenant to the first apartment unit; associating in the database one or more items of contact information of the other tenants to their respective apartment units; mapping the first apartment unit to one or more adjacent apartment units; providing to the first tenant computing device a graphical user interface with a list of messages for selection by the first tenant for transmission; and providing to the first tenant computing device a graphical user interface with a selectable map of the one or more adjacent apartment units for selection by the first tenant to which the selected message is to be transmitted.

In one example, the selectable map includes a graphical representation of an apartment unit above the first apartment unit, an apartment unit below the first apartment unit, an apartment unit to the left of the first apartment unit, and an apartment unit to the right of the first apartment unit.

In another example, the method may include transmitting on an anonymous basis the selected message to the other tenant associated with the adjacent apartment unit selected by the first tenant; and the selected message transmitted does not include any contact information of the first tenant. The list of messages may be formed to include a plurality of predetermined fixed messages—such as fixed messages relating to noise issues. The items of contact information stored in the database may include mobile phone numbers and/or email addresses of the tenants living in each apartment unit.

In another example, the method may include providing in the tenant computing device a display of the selected message; and providing a list of response messages for selection by the other tenant. The method may also include providing an activity log in the first tenant computing device with data relating to the transmitted message and a resolution status of the selected message.

In one example, the method may also include preventing, during a period of time (i.e., 15 minutes or other time periods), further transmissions of additional messages from the first tenant to the other tenant. The method may also include notifying an apartment manager computing device of the selected message sent from the first tenant to the other tenant.

In another embodiment, the method may include detecting if multiple messages have been sent to a tenant with a predetermined time period (i.e., 24 hours or other time periods), and if so, notifying an apartment manager computing device of the multiple messages.

According to another broad aspect of another embodiment of the present disclosure, disclosed herein is a system for anonymous communications between tenants in an apartment complex or other dwelling or housing complex. In one example, the system may include a communications engine operating on a server; a database coupled with the server, the database including contact information a respective apartment unit number relating to each tenant of the apartment complex; an interface operating on a first tenant mobile computing device, the interface including a graphical user interface with a list of messages for selection by the first tenant for transmission and a selectable map of the one or more adjacent apartment units for selection by the first tenant to which the selected message is to be transmitted. In one example, the list of messages includes predetermined fixed messages.

In another example, the selectable map includes a graphical representation of an apartment unit above the first apartment unit, an apartment unit below the first apartment unit, an apartment unit to the left of the first apartment unit, and an apartment unit to the right of the first apartment unit. The communications engine may be configured to prevent, during a period of time, further transmissions of additional messages from the first tenant to another tenant.

According to another broad aspect of another embodiment of the present disclosure, disclosed herein is a computer storage media used for providing anonymous communications between tenants of an apartment complex, comprising a module for providing a graphical user interface with a display of a plurality of adjacent apartment units for a user to select; and a module for providing a graphical user interface with a display of a plurality of fixed messages for transmission to one or more tenants associated with a selected adjacent apartment unit.

The features, utilities and advantages of various embodiments of the invention will be apparent from the following more particular description of embodiments of the invention as illustrated in the accompanying drawings.

BRIEF DESCRIPTION OF THE FIGURES

FIG. 23 illustrates an example of a graphical user interface for a computer display for property managers, including tenant contact information associated with apartment unit numbers and apartment floors/levels, in accordance with various embodiments of the present disclosure.

DETAILED DESCRIPTION

Figure 1:
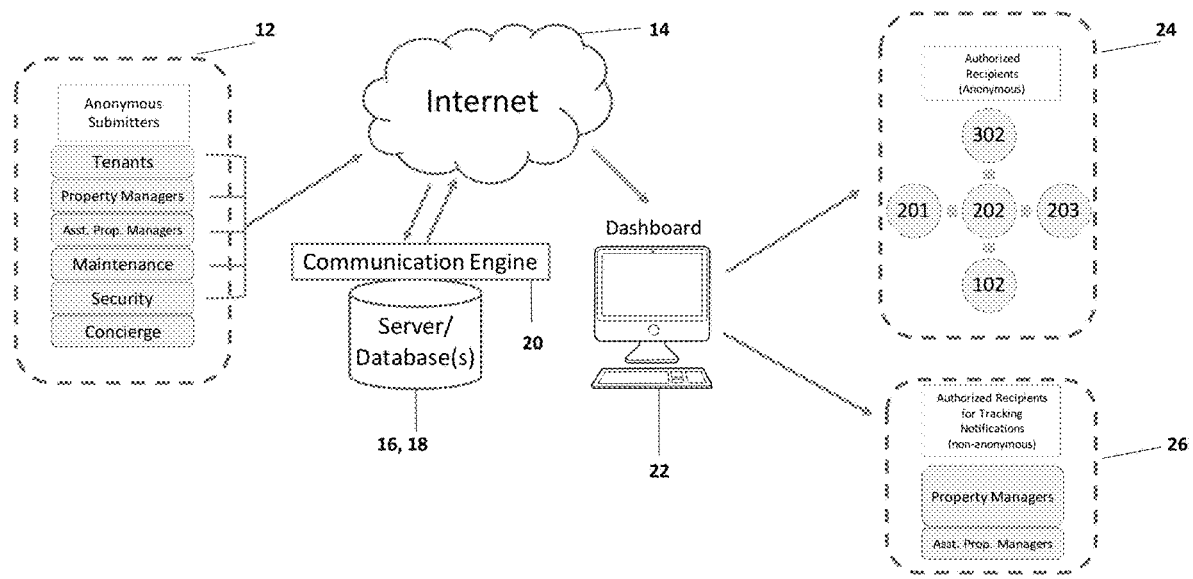
FIG. 1 illustrates a block diagram of an example of a system that may be used in accordance with various embodiments of the present disclosure.

Disclosed herein are various embodiments of devices, systems, and methods for anonymous tenant-to-tenant communications. As described herein, embodiments of the present disclosure provide for anonymously sending and receiving messages between tenants or residents of a dwelling such as an apartment complex or other residence. In one example, a communications engine may operate on a server and may act as a message relay device and data storage source, to provide anonymous messaging between tenants. Identity information is not shared as part of message transmissions between the tenants, and a tenant is not required to have the contact information of their neighbors in order to communicate when utilizing embodiments of the present disclosure (i.e., no personal identifiers are shared among tenants). Message content is preferably selectable from a set of predetermined or fixed messages, so as to provide messages that have standardized content, which can be useful in reducing conflicts when the messages relate to complaints such as noise complaints or other complaints. In one example, management of the apartment complex is made aware of the communications between tenants including notifications regarding the complaints as well as resolutions communicated relating to such complaints or messages which may be recorded in an activity log and may include a time/date stamp.

As described herein, a tenant mobile device (i.e., smartphone, tablet, etc.) may be provided with a tenant communication module, a tenant graphical user interface, and tenant controls which may operate within a tenant application program operating on the tenant's mobile device. Each of the tenants in an apartment complex may be provided with a tenant application program which is configured to communicate with a communications engine that acts as a message relay device, so as to enable communications between the tenants on an anonymous basis.

A server and database may be configured as described herein, with a communication engine that acts as a message relay device that enables anonymous communications between the tenants of the apartment complex. The database may securely store the mobile phone information of each tenant in the apartment complex, along with the name of the tenant and unit number of the residence of the tenant. The database may also include mapping data of the units of the apartment complex, so that the database can track which tenants live next door to, above, and below each of the other tenants in an apartment complex. In one example, the communications engine may access the database in order to transmit and receive messages from tenants by relaying messages between tenants on an anonymous basis—so that neither the transmitting tenant nor the receiving tenant is aware of the contact information of the other.

In one example, a manager module is provided which can be used by an apartment manager to configure and populate the database with the tenant information. The manager module many include a manager graphical user interface and manager controls in order to monitor and assist with anonymous communications between tenants of the apartment complex. As a new resident moves into the apartment complex, an apartment manager adds the new resident's contact information such as mobile phone numbers and apartment unit number/location into the database. As tenants move out of the apartment complex, the apartment manager deletes the former tenants contact information from the database while the mapping of the unit is maintained in the database.

In one example, the tenant's application program operating on their smartphone provides for the tenant to select a neighboring apartment unit to send a message to, and also provides for the tenant to select a message from a list of pre-defined messages to send to the tenant in neighboring apartment unit. In one example, the messages may include pre-defined messages such as "please be mindful neighbors," "please turn down TV/music," "please quiet footsteps," "please quiet pets," "please quiet guests," "this is a non-smoking building" or other messages depending upon the particular implementation.

The tenant's application program operating on their smartphone may include a graphical user interface to enable selection by a tenant of which neighbor/apartment to send the message to. In one example, the tenant's application program may include a graphical user interface including a plurality of selectable elements representing apartment units next door to the left, next door to the right, directly above, and directly below the tenant's apartment. The graphical user interface can also receive input from the tenant specifying a specific apartment complex number (i.e., Apartment #306) to direct the message.

In this manner, the tenant using their smartphone can select or specify the target apartment unit to direct the message towards, without the tenant's smartphone having to contain or store the contact information of the various neighbors of the apartment complex (i.e., no personal identifiers are shared among neighbors). In this manner, embodiments of the present disclosure improve efficiencies over existing computing systems and user's devices (i.e., smartphones, tablets, etc.) by speeding transmission of messages between tenants of an apartment complex, since the contact information of the residents of an apartment complex is maintained externally to the tenant's mobile phone. Embodiments of the present disclosure also are an improvement over existing computing systems since the present disclosure reduces the amount of contact information data required to store in a memory of a user's device when living in an apartment complex.

It is understood that embodiments of the present disclosure can be utilized in various dwellings where people live, such as apartments, dormitories, hotels, condominiums, military housing, or other dwellings. For illustrative purposes and simplicity of this disclosure, and without limiting the scope or use of the present disclosure, embodiments of the present disclosure will be described in terms of tenants, residents or persons living in an apartment complex where the apartment complex includes multiple apartments or apartment units. It is understood that embodiments of the present disclosure can use in numerous different settings for dwellings including dormitories, apartments, condominium complexes, apartment buildings, or other structures where multiple tenants, persons, or families reside. There is no limitation of the number of units that can be mapped and utilized, in one example.

Various examples of the present disclosure will not be described with reference to FIGS. 1-30. FIG. 1 illustrates a block diagram of an example of a system for anonymous tenant to communications. In one example, system 10 may include a mobile device 12 such as a smart phone or tablet of a transmitting entity such as a tenant, property manager, assistant property manager, maintenance staff, or security staff. For purposes of simplicity of disclosure, device mobile device 12 will be described in terms of the tenant's mobile device/smartphone. Mobile device 12 may include one or more of the features, functions or operations as described herein, for instance in the form of an application program operating on mobile device 12.

The system may also include a wired or wireless network 14 such as the Internet, and server 16 communicatively coupled with database 18. Communication engine module 20 may be provided to operate on server 16, in one example. In one example, server 16 and database 18 may be combined into a single unit. Communication engine module 20 may include one or more of the operations, functions, or logic disclosed herein in order to facilitate anonymous communications as described herein.

A computing device 22 for a manager (such as an apartment manager) may be provided and communicatively coupled with network 14. Device 22 can provide a dashboard or other graphical user interface for an apartment manager, for instance in one example, to view an activity log with time stamps, date and sender and receiver of notification, and to monitor communications of issues and the resolutions between tenants 12, 24 of the apartment complex. Computing device 22 may also be used by a manager to populate database 18 with the contact information (i.e., mobile phone number or email address) of the various tenants 12, 24 living within the apartment complex, as well as the apartment units associated with each tenant, and the locational relationship between each of the units within the apartment complex.

Target recipients or receiving tenants mobile devices 24 are illustrated in FIG. 1, understanding that depending upon the situation, a tenant may be a transmitter 12 or a receiver 24 utilizing the tenant's mobile device. In this regard, mobile device 24 may include one or more of the features, functions or operations as described herein, for instance in the form of an application program operating on mobile device 24.

Messages may also be transmitted to management recipients computing devices 26 as shown in FIG. 1, for instance when an apartment manager utilizes a smart phone 26 and receives various notifications regarding messages that are being transmitted between tenants of the apartment complex.

In one example, the database 18 can maintain a list, chart, table or other data structure containing information relating to each tenant in the apartment complex—such as but not limited to name, unit number, contact information (e.g., email address, mobile phone number). The database may also contain a mapping of unit numbers relative to one another in the apartment complex—for instance, for apartment number #206, the unit next door to the left is unit #205, the unit next door to the right is unit #207, the unit above is unit #306, the unit below is unit #106. Such mapping data may be maintained for each of the units in the apartment complex—for instance, as is illustrated in the examples of FIGS. 22-26.

Figure 2:
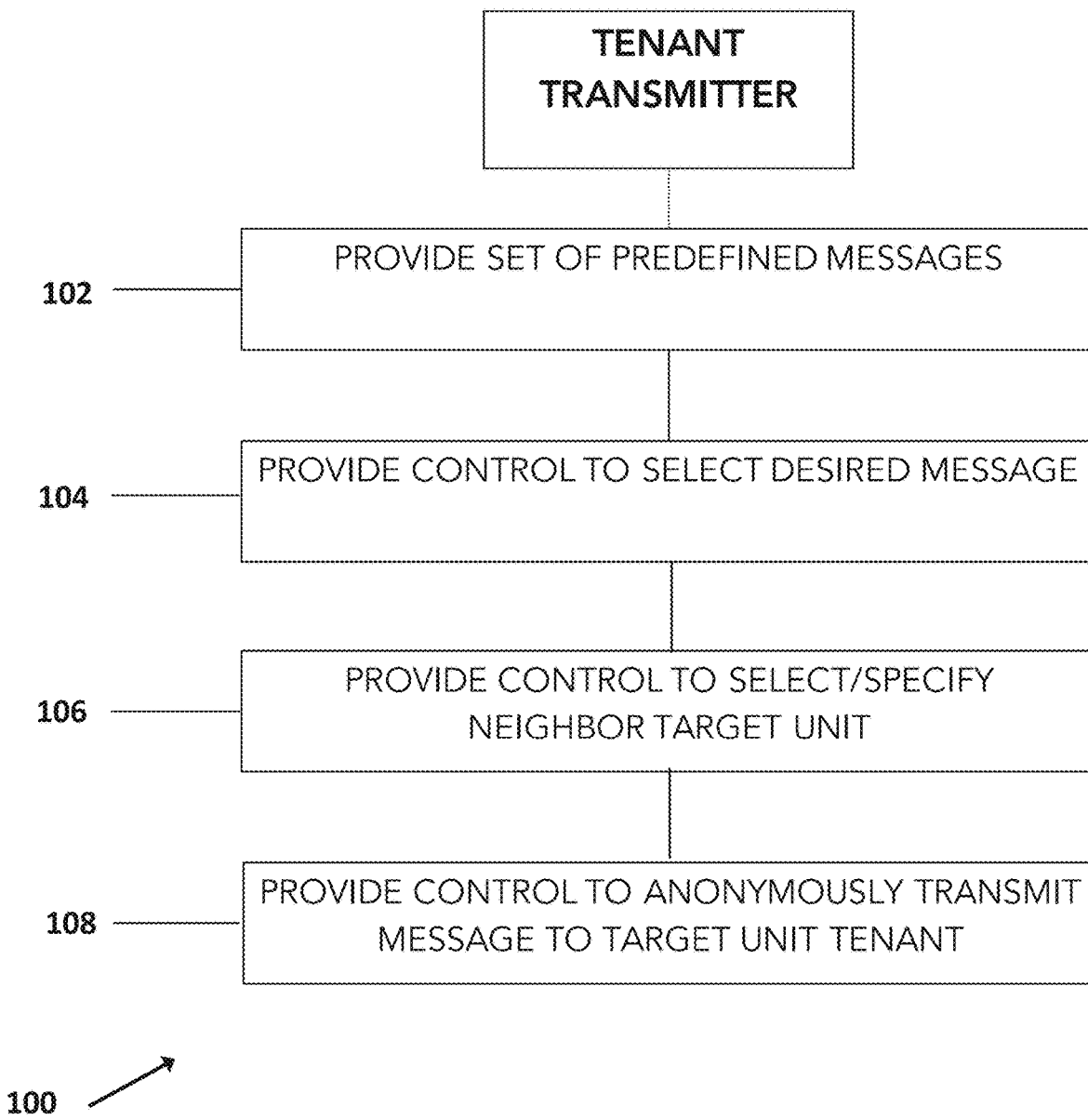
FIG. 2 illustrates a flow chart of an example of a process that may be used for a tenant to initiate a request for communications with another tenant, in accordance with various embodiments of the present disclosure.

FIG. 2 illustrates an example of operations 100 of a module of a tenant's mobile device for transmitting anonymous messages directed towards other tenants in an apartment complex, in accordance with one embodiment of the present disclosure. These operations may be included within an application program operating on mobile device 12, in one example.

At operation 102, a set of predefined messages is provided for selection by a tenant using their mobile device. In one example, these predefined messages may include but are not limited to "please be mindful neighbors," "please turn down TV/music," "please quiet footsteps," "please quiet pets," "please quiet guests," "this is a non-smoking building" or other messages depending upon the particular implementation.

Figure 6:
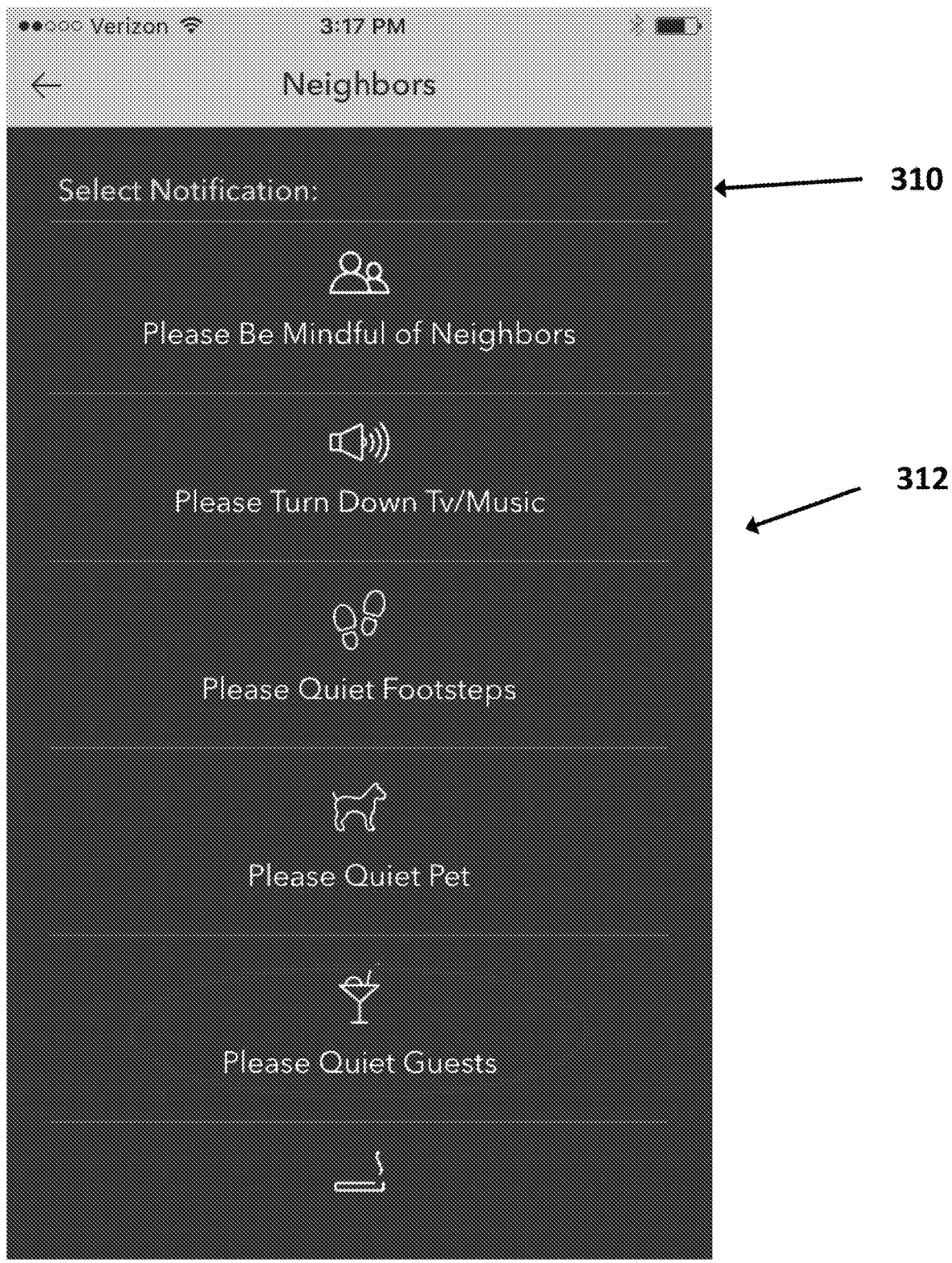
FIG. 6 illustrates an example of a graphical user interface for a computer display for a tenant to select a message from a list of pre-determined fixed messages for communications with another tenant in accordance with various embodiments of the present disclosure.

At operation 104, controls are provided for a tenant on their smartphone to select one of the predefined messages to send to a neighbor. FIG. 6 illustrates an example of a graphical user interface 310 that provides a set of selectable, pre-defined messages 312 for the tenant to select from.

At operation 106 of FIG. 2, controls are provided for the tenant to select or specify the neighbor target unit, in order to direct the desired selected message to the tenant within that unit. In one example, the tenant's application program may include a graphical user interface including a plurality of selectable elements representing apartment units next door to the left, next door to the right, directly above, and directly below the tenant's apartment. The graphical user interface may also provide an input data field where the tenant can specify a specific apartment unit number (i.e., Apartment #306) to direct the message, without disclosing or displaying personal identifiers such as name or contact information of a tenant or neighbor. In this manner, the tenant can specify or select the neighboring apartment unit which is related to the message that the tenant desires to send. For instance, if music is being played at an excessively high volume in the apartment unit above the tenant's apartment, the tenant can utilize the graphical user interface to select the apartment unit above—without the tenant having to know unit number above the tenant or without having to know the name or contact information of the person living in the apartment unit above.

Figure 7:
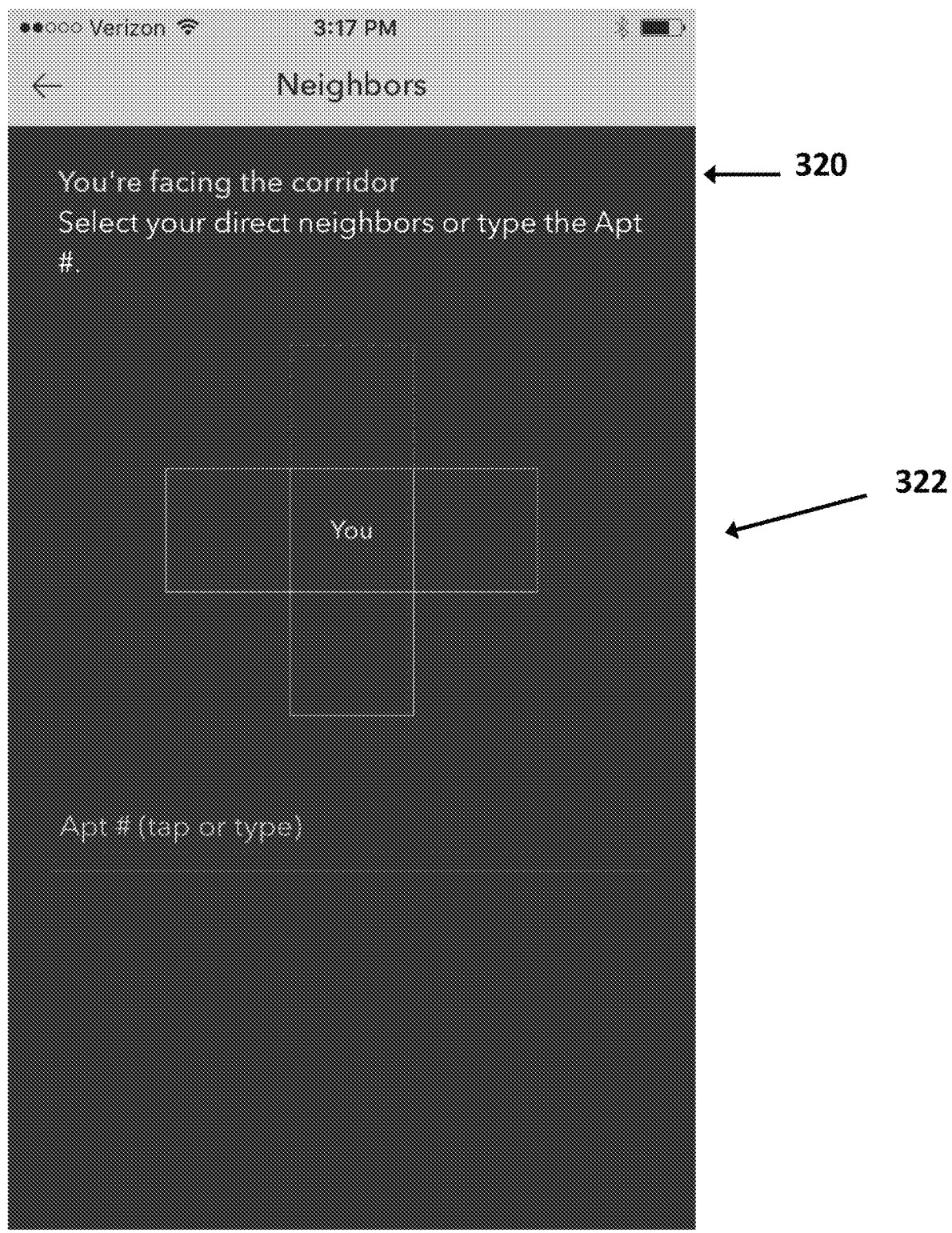
FIGS. 7-8 illustrates examples of graphical user interfaces for a computer display for a tenant to select the unit/apartment for communications with another tenant through a selectable map of adjacent units, in accordance with various embodiments of the present disclosure.
Figure 8:
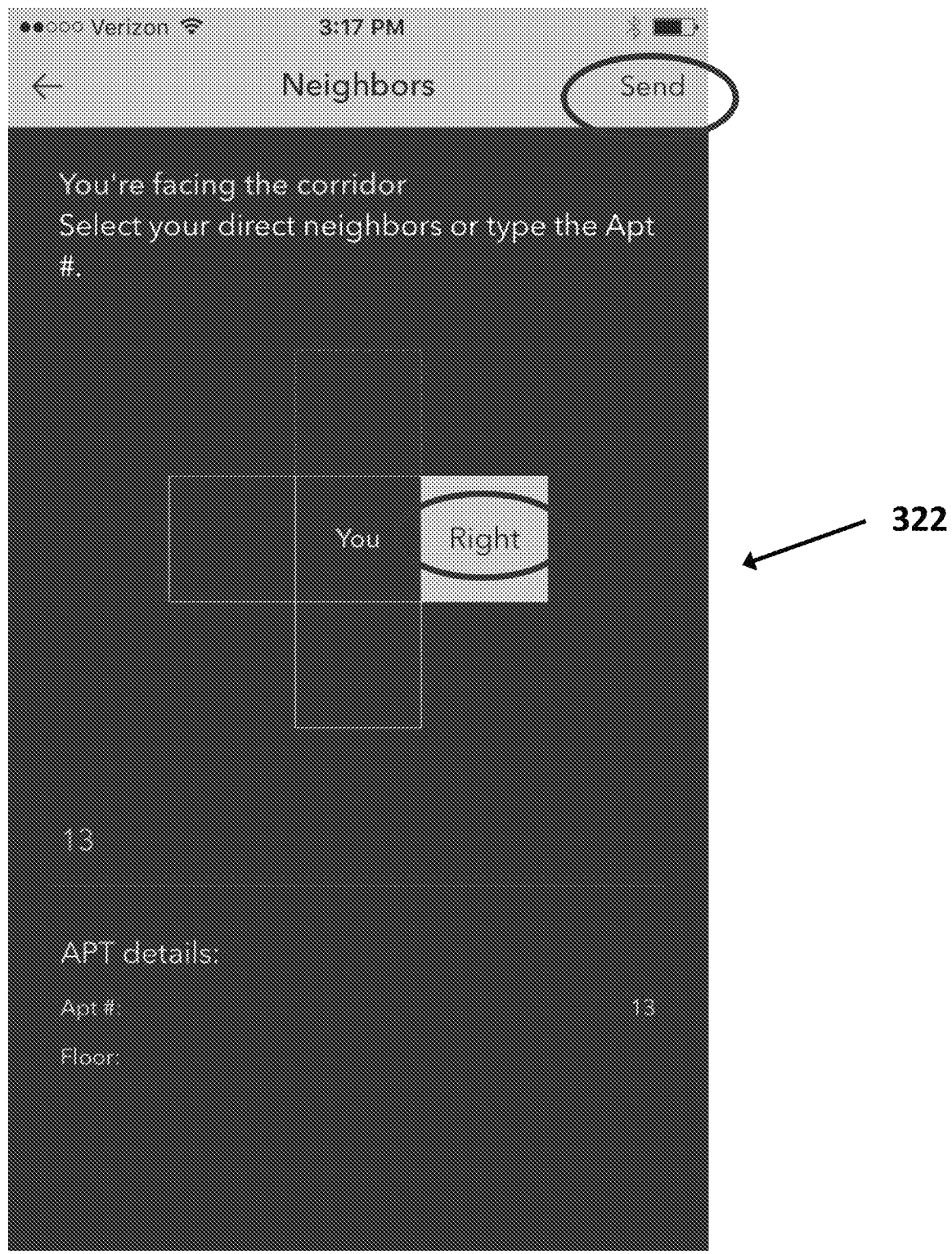
Figure 9:
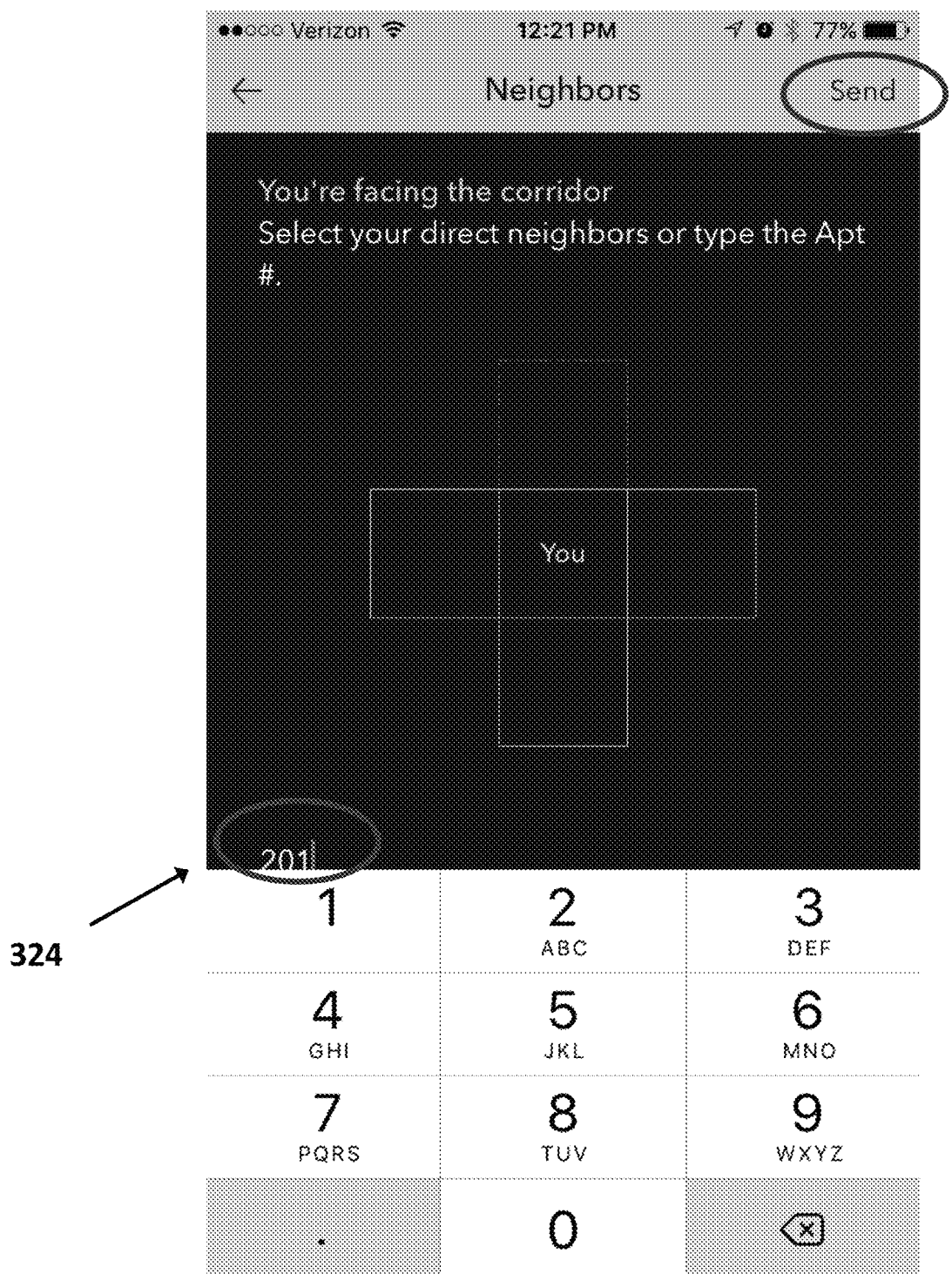
FIG. 9 illustrates an example of a graphical user interface for a computer display for a tenant to specify the unit/apartment for communications with another tenant in accordance with various embodiments of the present disclosure.

FIGS. 7-8 illustrate examples of graphical user interfaces 320 that provide selectable controls 322 for a tenant to specify which unit (such as an adjacent unit) is related to the tenant's concern (e.g., unit to the right, unit to the left, unit above, unit below). FIG. 9 illustrates an example of a graphical interface with a fillable data field 324 where the tenant can type in an apartment number related to the tenant's concern.

At operation 108 of FIG. 2, controls are provided to anonymously transmit the selected message to the target unit tenant (see, e.g., "Send" control in FIGS. 8-9). In one example, the selected message is sent from the tenant's device 12 to the communication engine 20 and/or management module device 22—which as described below in FIG. 4, then processes the message and transmits the message to the target tenant. In one example, no communications occurs directly between tenant device 12 and target tenant device 24—but instead, messages are relayed through communication engine 20 or manager device 22.

Figure 10:
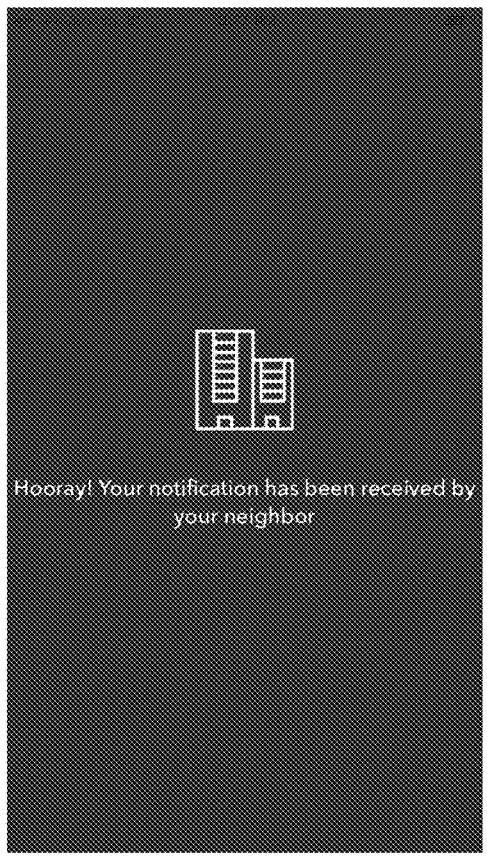
FIG. 10 illustrates examples of graphical user interfaces for a computer display providing message transmission status information to a tenant that requested communications with another tenant, in accordance with various embodiments of the present disclosure.
Figure 10:
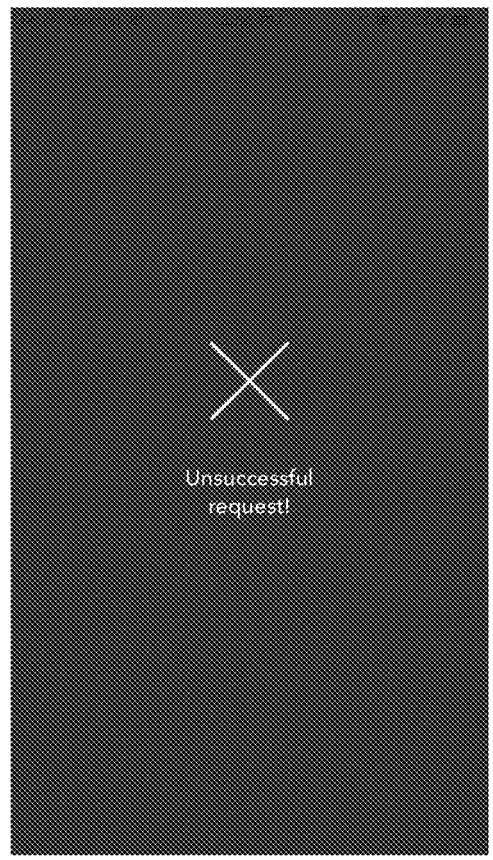
Figure 11:
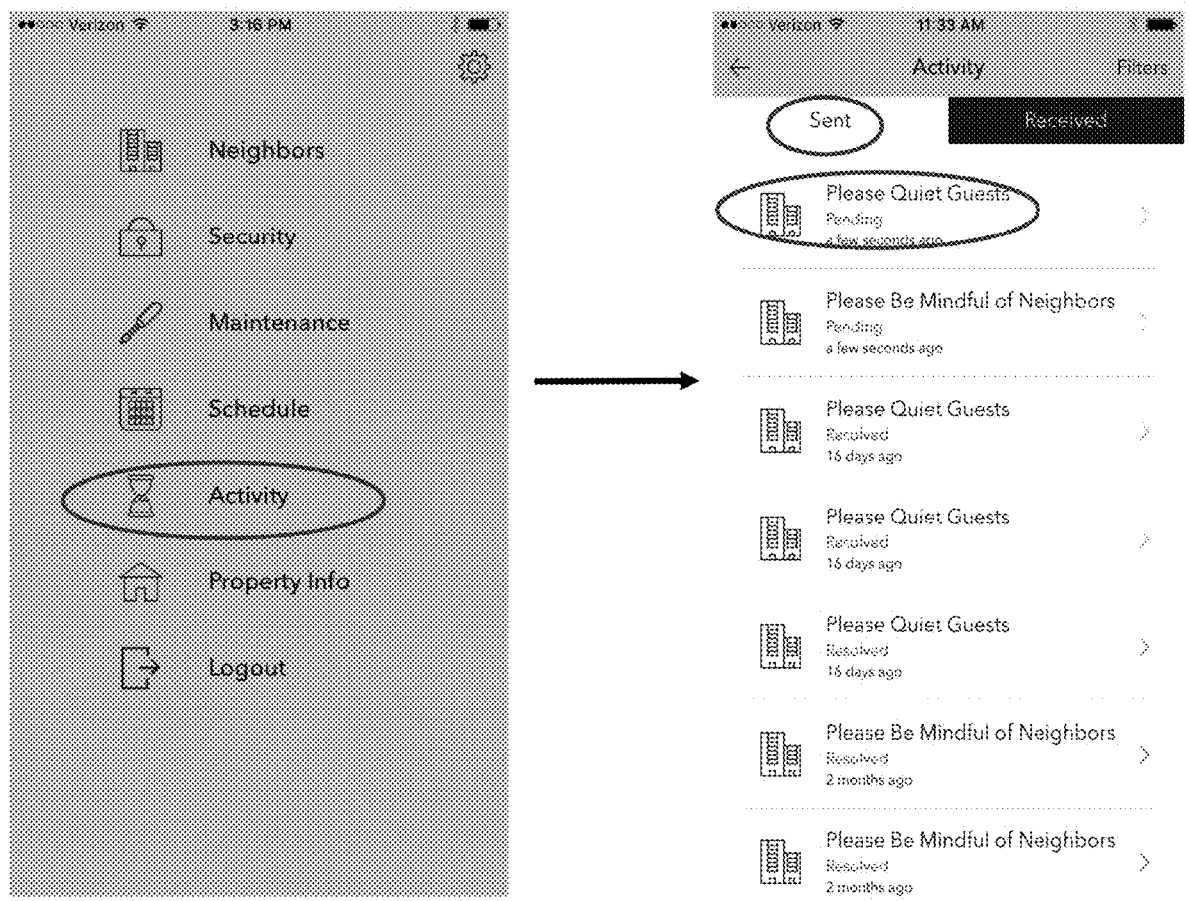
FIG. 11 illustrates examples of graphical user interfaces for a computer display providing an activity log of transmitted messages and their resolution status, in accordance with various embodiments of the present disclosure.

Once the selected message has been sent to the target recipient tenant (e.g., device 24), a message may be displayed to the transmitting tenant (such as on their device 12), such as illustrated in FIG. 10. The application program operating on the tenant's device 12 may also provide a log of activity including sent messages and their status (pending, resolved) as shown in the example display screen of FIG. 11.

Figure 3:
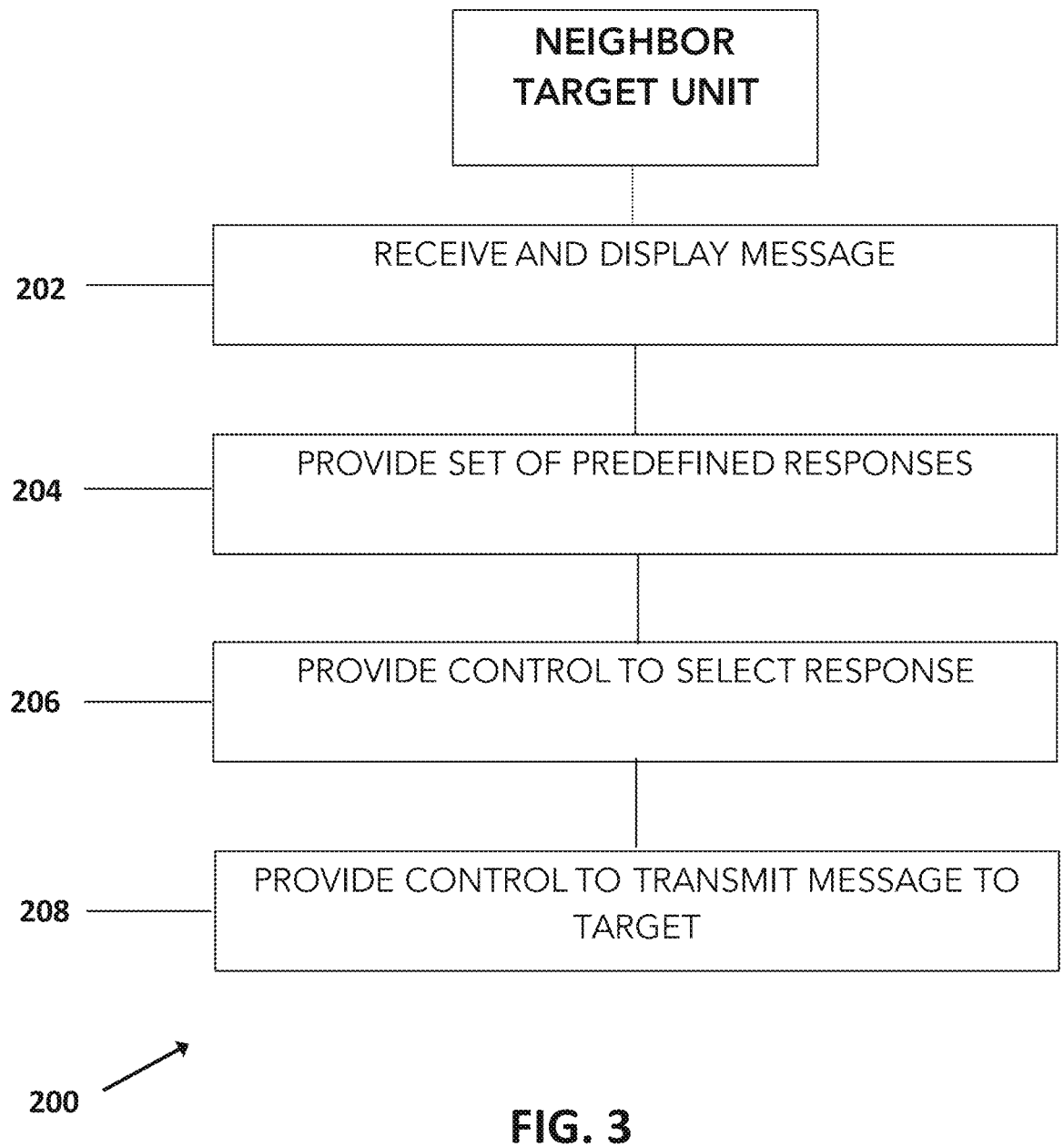
FIG. 3 illustrates a flow chart of an example of a process for a tenant to request communications in response to another tenant in accordance with various embodiments of the present disclosure.

FIG. 3 illustrates an example of operations 200 of a module of a neighboring tenant's mobile device for receiving anonymous messages from another tenant in an apartment complex, in accordance with one embodiment of the present disclosure. These operations may be included within an application program operating on mobile device 24 (or 12), in one example.

Figure 12:
FIG. 12 illustrates an example of a graphical user interface for a computer display providing a notification to a tenant that a message from another tenant has been received and requires action, in accordance with various embodiments of the present disclosure.
Figure 13:
FIG. 13 illustrates an example of a graphical user interface for a computer display providing a home screen for a tenant, in accordance with various embodiments of the present disclosure.
Figure 14:
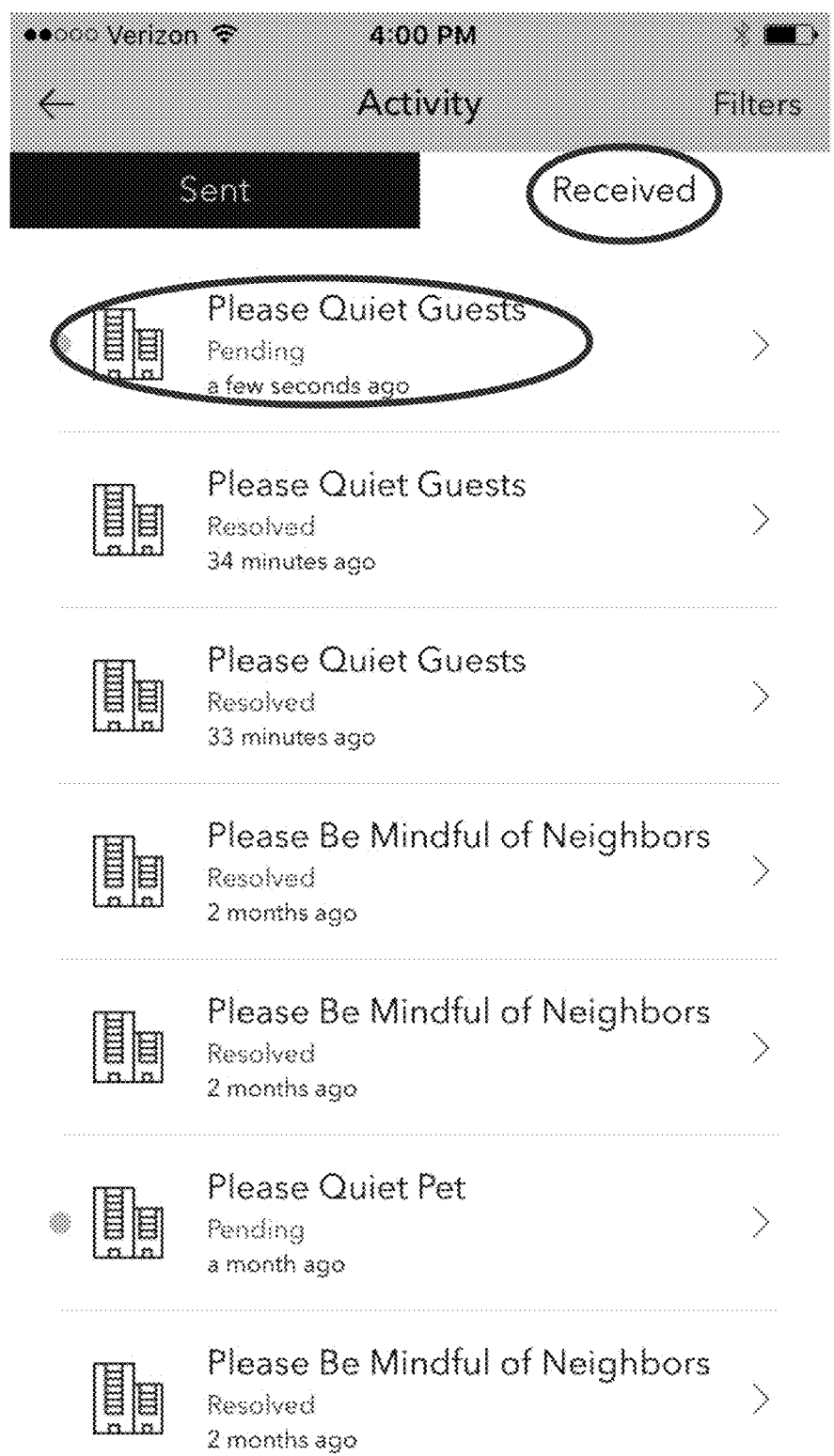
FIG. 14 illustrates an example of a graphical user interface for a computer display providing an activity log of received messages and their resolution status, in accordance with various embodiments of the present disclosure.
Figure 15:
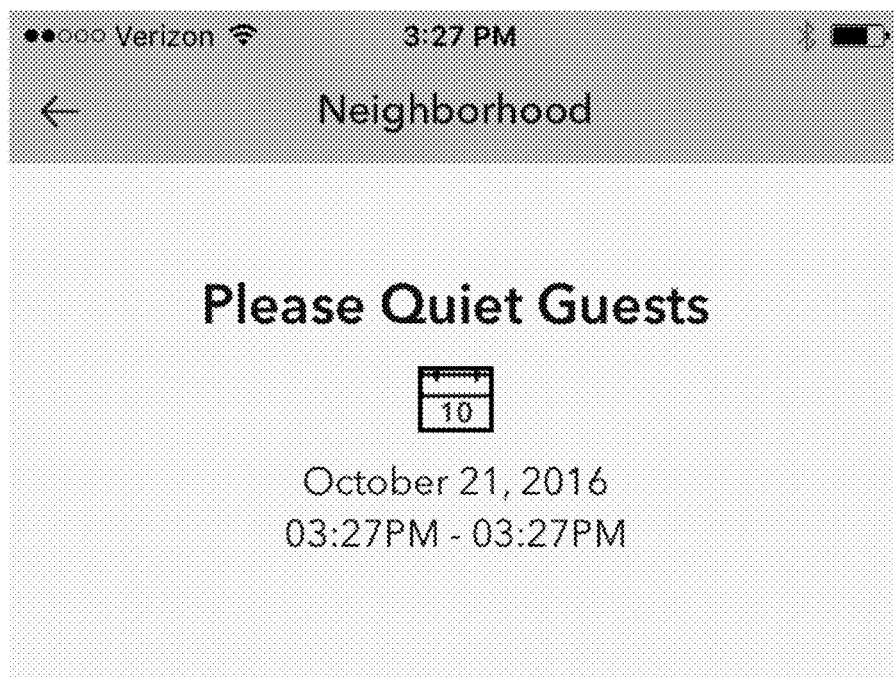
FIG. 15 illustrates an example of a graphical user interface for a computer display showing a tenant the message content received from another tenant, and a control for responding to the message, in accordance with various embodiments of the present disclosure.

At operation 202, the mobile device 24 receives and displays the message. FIGS. 12 and 14-15 illustrate examples of graphical user interfaces displaying messages sent by another tenant. In one example, the message content is dictated by pre-defined messages of operation 102-104 of FIG. 2, and may include a time and date stamp.

Figure 16:
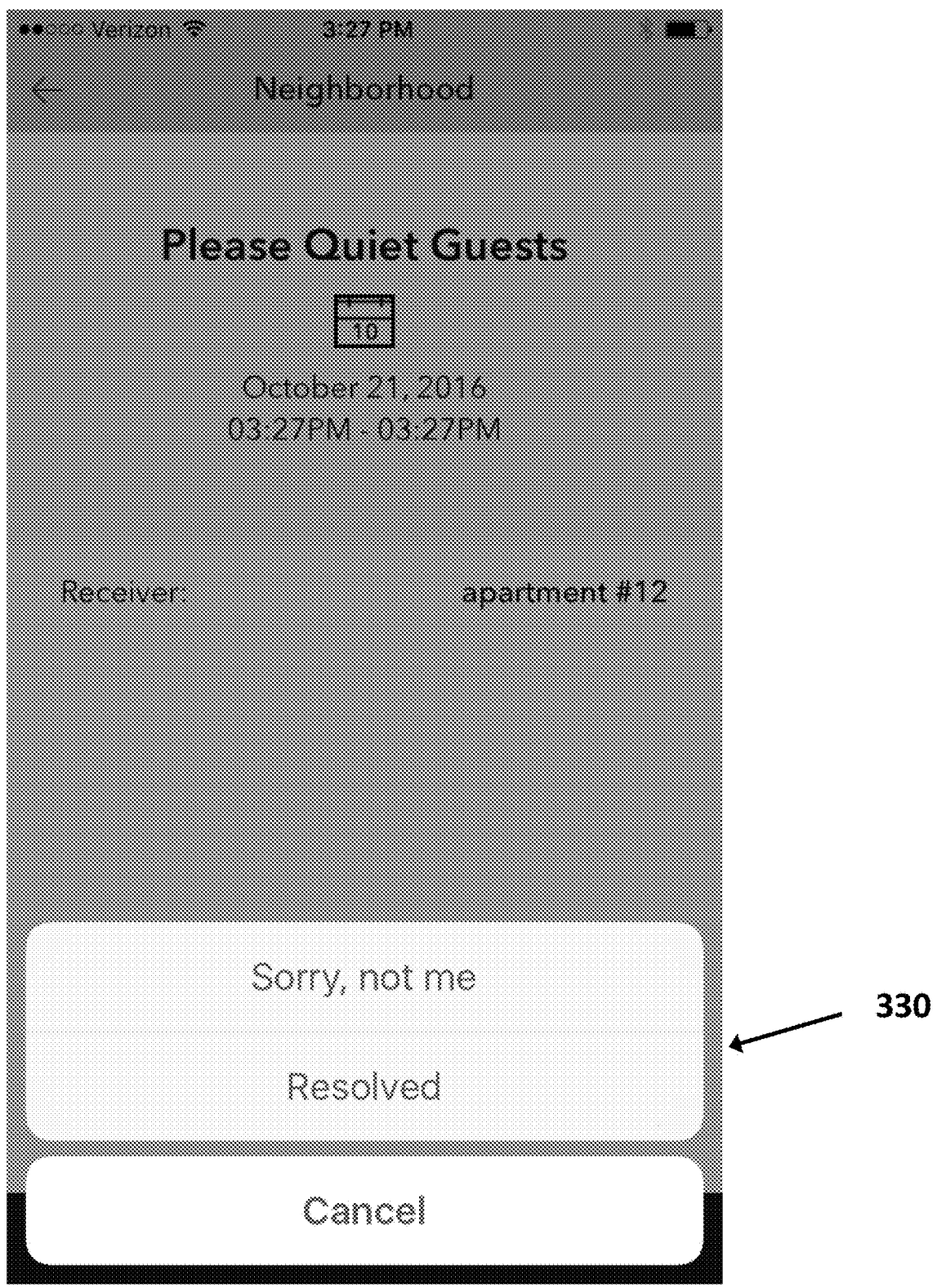
FIG. 16 illustrates an example of a graphical user interface for a computer display showing a tenant the message content received from another tenant, and a control for selecting a pre-determined fixed response message, in accordance with various embodiments of the present disclosure.
Figure 17:
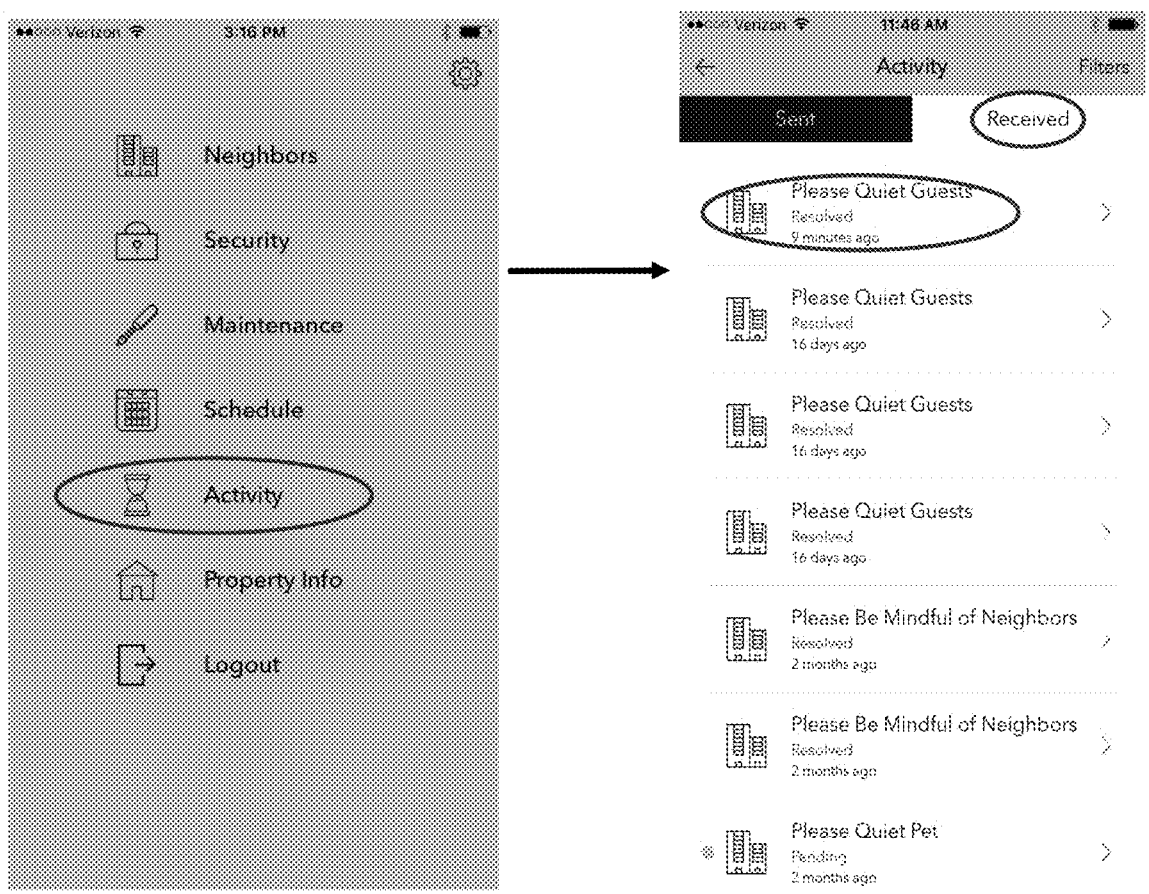
FIG. 17 illustrates examples of graphical user interfaces for a computer display providing an activity log of received messages and their resolution status, in accordance with various embodiments of the present disclosure.
Figure 18:
FIGS. 18-19 illustrate examples of graphical user interfaces for a computer display providing a tenant with resolution status updates of transmitted messages, in accordance with various embodiments of the present disclosure.
Figure 19:
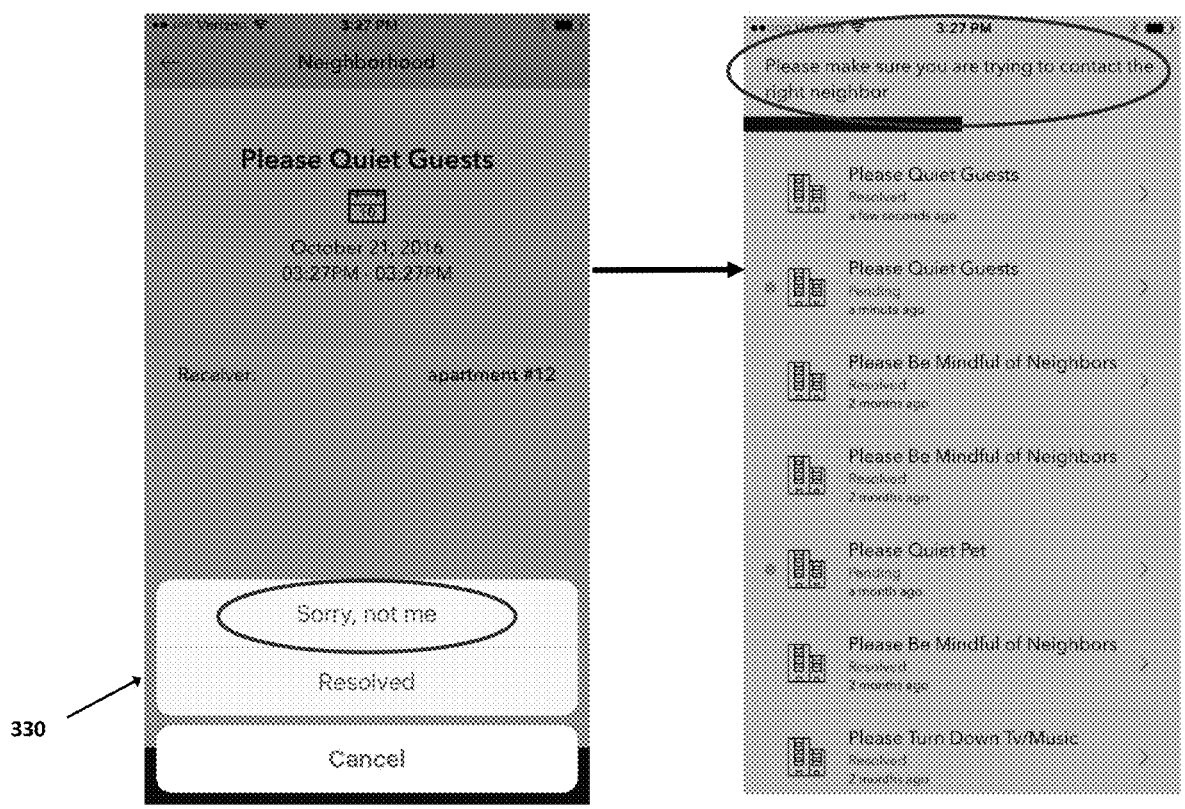
Figure 20:
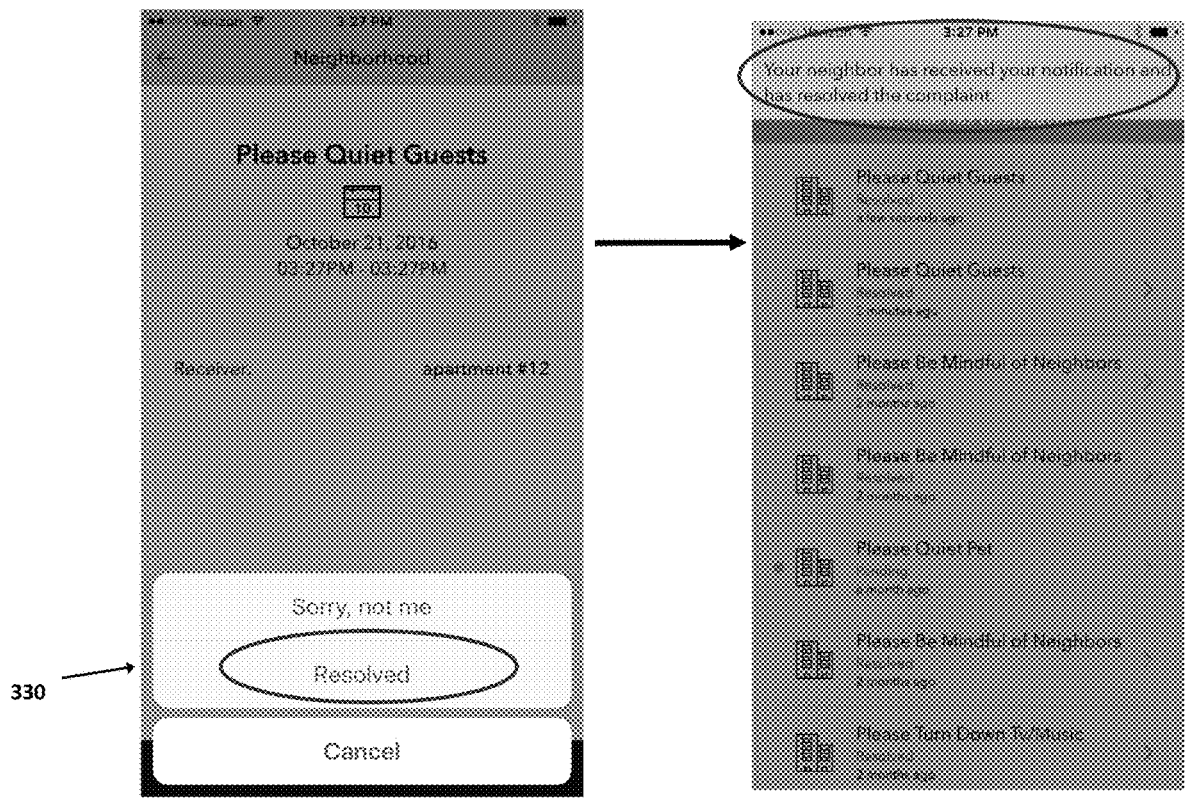
FIG. 20 illustrates another example of graphical user interfaces for a computer display providing a tenant with resolution status updates of transmitted messages, in accordance with various embodiments of the present disclosure.
Figure 21:
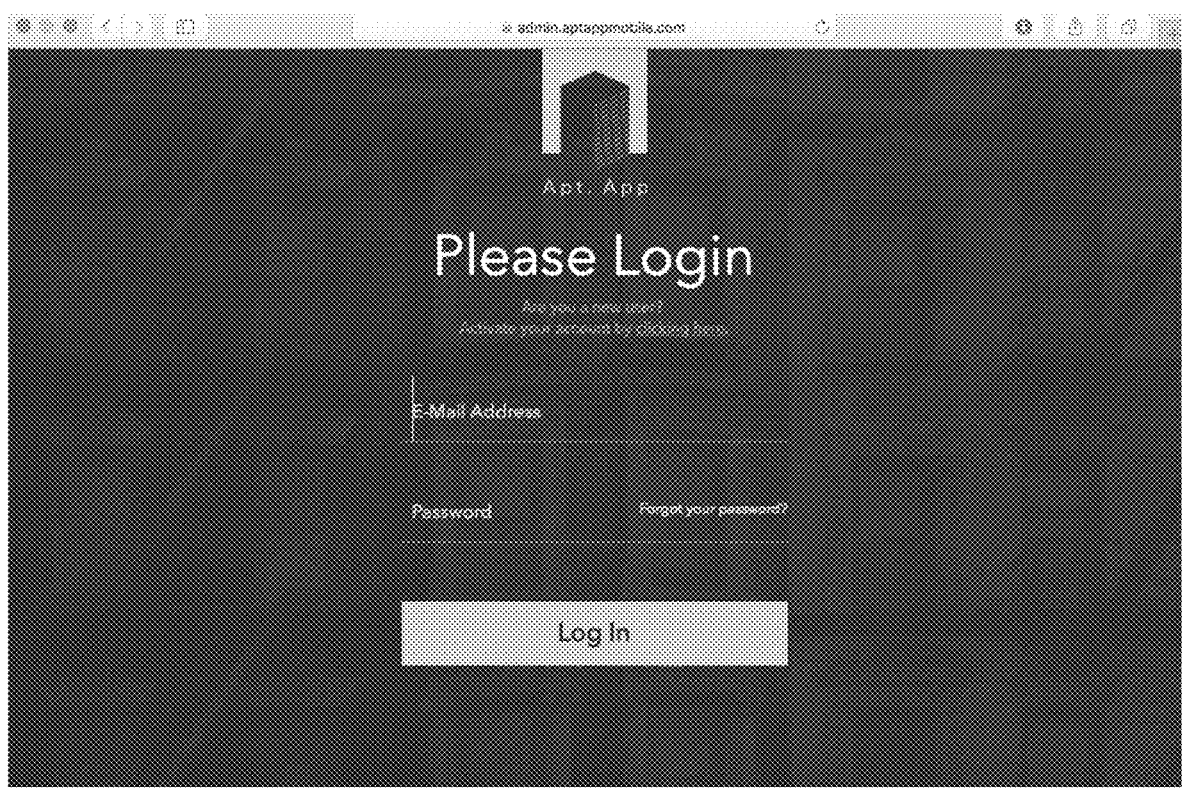
FIG. 21 illustrates an example of a graphical user interface of a login page for a dash-board for property managers, in accordance with various embodiments of the present disclosure.
Figure 22:
FIG. 22 illustrates an example of a graphical user interface for a computer display for property managers, including property owner data of an apartment complex, in accordance with various embodiments of the present disclosure.

At operation 204 of FIG. 3, a set of predefined response messages is provided for selection by the receiving tenant using their mobile device. In one example and as shown in the example of FIGS. 16 and 19-20, these predefined messages 330 may include but are not limited to "Sorry, not me" indicating that the receiving tenant does not believe the message corresponds to them, or "Resolved" indicating that the receiving tenant has resolved the issue. Other response messages may be utilized depending upon the particular implementation.

At operation 206, controls are provided for the receiving tenant on their smartphone or tablet or other computing device to select one of the predefined response messages. FIGS. 16, 19 illustrate an example of graphical user interfaces that provide a set of selectable, pre-defined response messages 330 for the receiving tenant to select from.

At operation 208 of FIG. 3, controls may be provided to anonymously transmit the selected response message. In one example, the selected response message is sent from the target tenant's device 24 to the communication engine 20 and/or management module device 22. In one example, no communications occurs directly between target tenant device 24 and tenant device 12—but instead, messages are relayed through communication engine 20 or manager device 22.

In this manner, the receiving tenant 24 can receive the neighbor's message and take appropriate action to resolve the issue, and then respond in an anonymous manner indicating for instance that the issue has been resolved—without the receiving tenant having to know the name or contact information of the person who sent the message. The application program operating on the receiving tenant's device 24 may also provide a log of activity including received messages and their status (pending, resolved) as shown in the example display screen of FIGS. 14, 17.

If the receiving tenant indicates that the initial message does not correspond to them ("Sorry, not me"), a message is sent to tenant device 12 indicating to "Please make sure you are trying to contact the right neighbor" as shown in the example of FIG. 19.

If the receiving tenant indicates that the issue has been resolved, a message is sent to tenant device 12 indicating that "Your neighbor has received your notification and has resolved the complaint" as shown in the example of FIG. 20.

Figure 29:
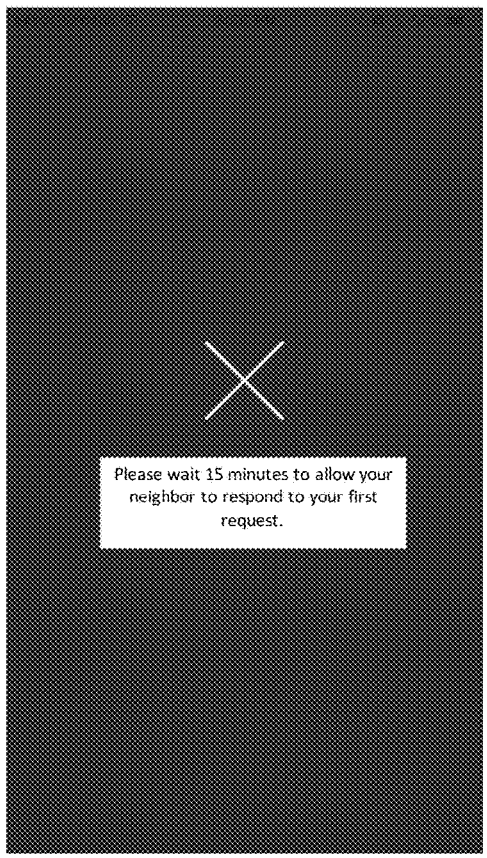
FIG. 29 illustrates an example of a graphical user interface for a computer display providing a tenant with a notice that additional message transmissions are being prevented for a time period (i.e., 15 minutes), in accordance with various embodiments of the present disclosure.

In one example, the application may be configured such that a tenant device is permitted to send a message/notification to a neighbor device once every defined time period (e.g., once every 15 minutes) in order to give the receiving tenant an opportunity to address the complaint and resolve the issue. If a tenant attempts to send multiple messages within a defined time period, such message transmission can be locked out, such as shown in FIG. 29.

Figure 30:
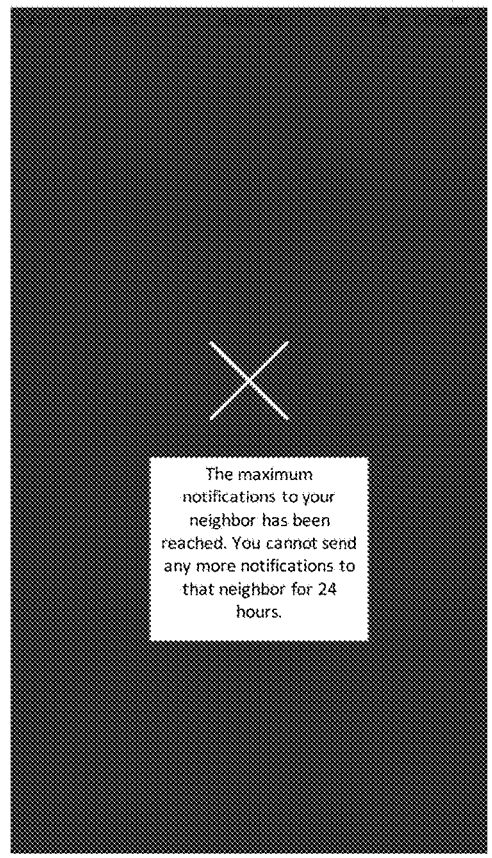
FIG. 30 illustrates an example of a graphical user interface for a computer display providing a tenant with a notice that additional message transmissions are being prevented for a time period (i.e., 24 hours), in accordance with various embodiments of the present disclosure.

In another example, a sending tenant (A) will be blocked out from sending more than three messages to the same receiving tenant (B) within a 24 hour time period. In this example, tenant (A) may not be blocked out from sending messages to other neighbors that are not tenant B in that 24 hour blocked time, such as shown in FIG. 30.

In one example, issues can be automatically escalated upon the occurrence of certain events. Escalation of an issue can result in an email, message or direct message being sent to a property manager so that the property manager can be made aware of the issue.

In one example, a property manager receives an email or message from the communications engine 20 when three or more neighbors have transmitted messages to the same tenant/resident/apartment in a 24-hour period. For example, if Apt. #100, #102, #201 all sent a notification to the resident in Apt. #101 in a 24-hour period, this can trigger the transmission of an email or message to the property manager explaining that there were multiple issues with one resident (Apt. #101), thereby making the property manager aware of the issue.

In another example, an email or message may also be sent from the communications engine 20 to the property manager when a sending tenant (A) has been blocked from sending any more notifications to receiving tenant (B) for 24 hours and that it is recommended for the property manager to look into the issue.

In one example, the property manager can utilize the system of the present disclosure to intervene to resolve issues, as controls may be provided for the property manager application program to respond to messages sent by tenants by answering with pre-determined fixed messages such as "issue solved" or "no issue found" or other fixed message. In one example, this response will be sent to sending tenant (A) and receiving (B) via pop up notification and also will appear in their activity log. After the manager attends to the issue, tenant (A) will be able to send more notifications to tenant (B) as normal.

If one particular resident is abusing their messaging privileges, in one example the communication engine can block such tenant from sending any notifications/messages to other tenants, but such tenant can still receive them. Thresholds or limits on messaging can be established and maintained by the communications engine which when exceeded by a tenant, can be used to temporarily block further messaging from such tenant.

In one example, statistics may be maintained by the communications engine 20/database 18 viewable to the property manager and assistant manager to data relating to neighbor notifications, escalations, response times, non-responsive tenants, tenants escalating issues repeatedly, and escalation resolution.

Figure 4:
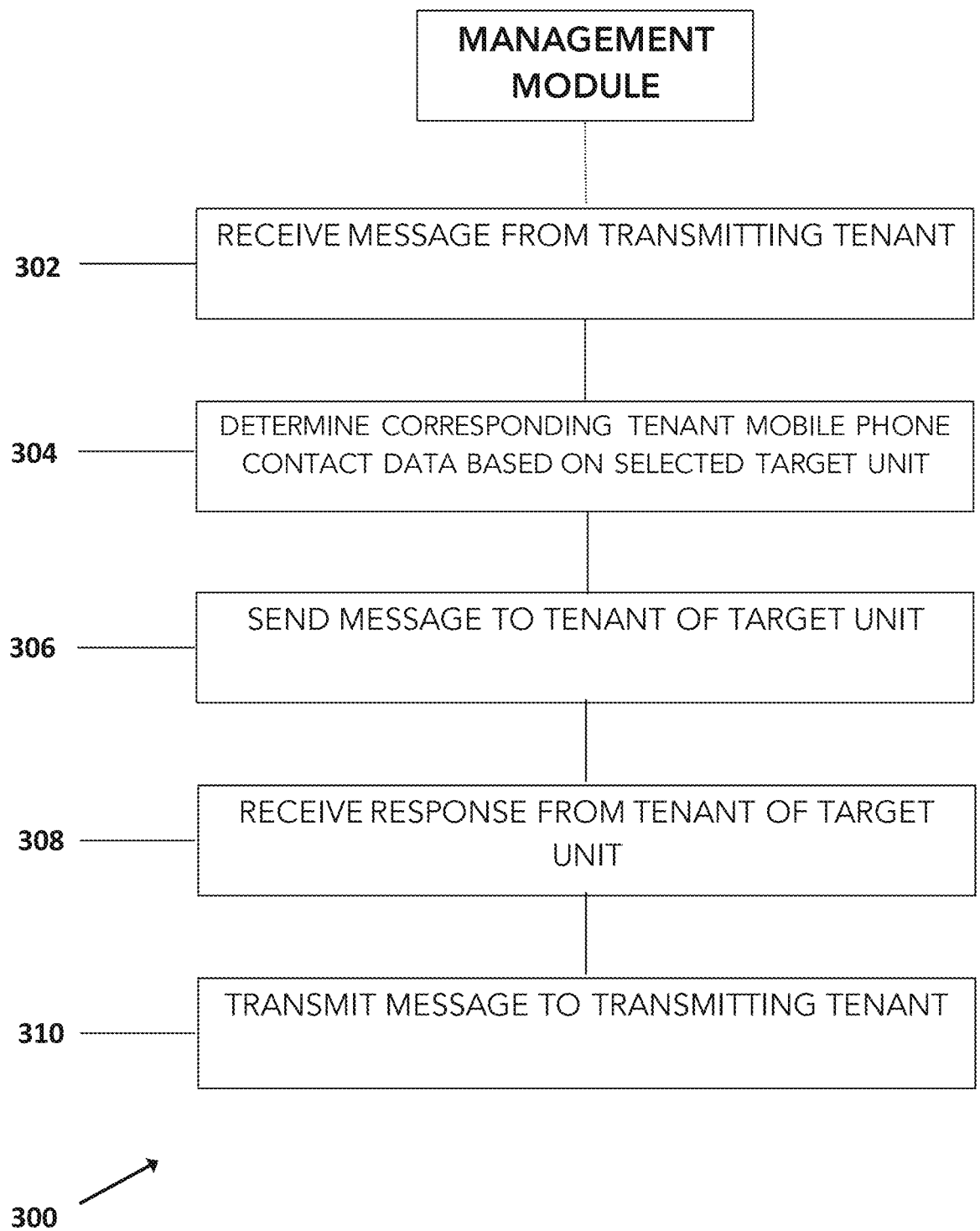
FIG. 4 illustrates a flow chart of an example of a process for a management module/communications engine/relay device to facilitate communications between two or more tenants, in accordance with various embodiments of the present disclosure.
Figure 5:
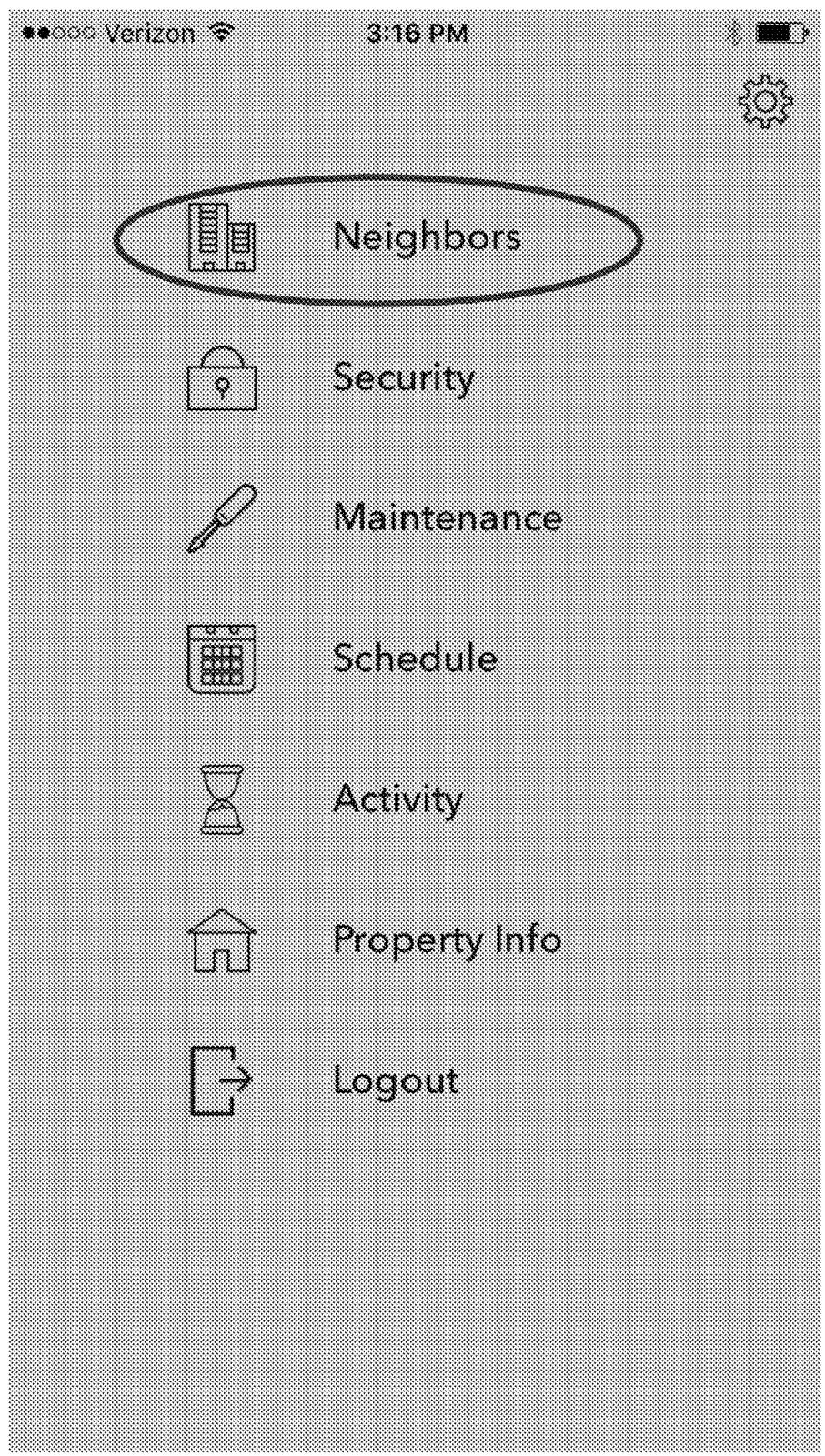
FIG. 5 illustrates an example of a graphical user interface for a computer display for a tenant to initiate a request for communications with another tenant in accordance with various embodiments of the present disclosure.

FIG. 4 illustrates an example of operations 300 of a management module or communication engine 20 (FIG. 1), in accordance with one embodiment of the present disclosure. For instance, one or more of these operations may be included within an application program operating on computing device 22, in one example. In another example, one or more of these operations may be included within communications engine 20.

At operation 302, a message request is received from the transmitting tenant 12. As described above, the message includes the message content, the sender's information, and the selected indication of the target tenant unit location or unit number. For instance, "Please quiet pet" message from unit #206 to be sent to the unit above such as unit #306.

At operation 304, a determination is made as to the intended recipient. This determination may be made based on mapping data (for instance, mapping data 350 in FIG. 24) that maps between the sender's unit location and the location of the other apartment units in the apartment building, as well as the data provided by the sender as to the location of the target apartment unit along with contact information data maintained in database 18. For instance, if the message received is from unit #206 and is to be sent to the unit above (i.e., unit #306), the process may perform a lookup in database 18 of the mapping data (for instance, mapping data 350 in FIG. 24) to determine that the target unit is unit #306. The database 18 can then be accessed to retrieve the contact information (e.g., cell phone number or email address) of the tenant who resides in unit #306. In this way, communications engine 20 or device 22 can determine the recipient's contact information securely and without disclosing such information to the transmitting tenant.

Hence, communication engine 20 or computing device 22 now are aware of the desired message content, the message sender, and the contact information (i.e., mobile phone number or email address) of the target tenant. At operation 306, the selected message is sent to the target tenant's computing device 24. In one example, the message is sent from the server 18 or from computer 22—but preferably, the message is not sent from the tenant device 12.

At operation 308, a response is received from the target tenant, and may be processed or logged by the communication engine 20 or device 22. At operation 310, an update message is then sent to the sending tenant regarding the status of the complaint. In one example, the update message is sent to the sending tenant from the server 18 or from computer 22—but preferably, the update message is not sent from the tenant device 12.

In this manner, the management module and/or communication engine 20 can enable anonymous communications between tenants in a building.

FIGS. 21-26 illustrate examples of display screens and input screens for the management module which may operate at device 22 in FIG. 1. In one example, the management module is intended for use by an apartment manager, staff or other administrator, but is not intended for use by tenants.

Figure 23:
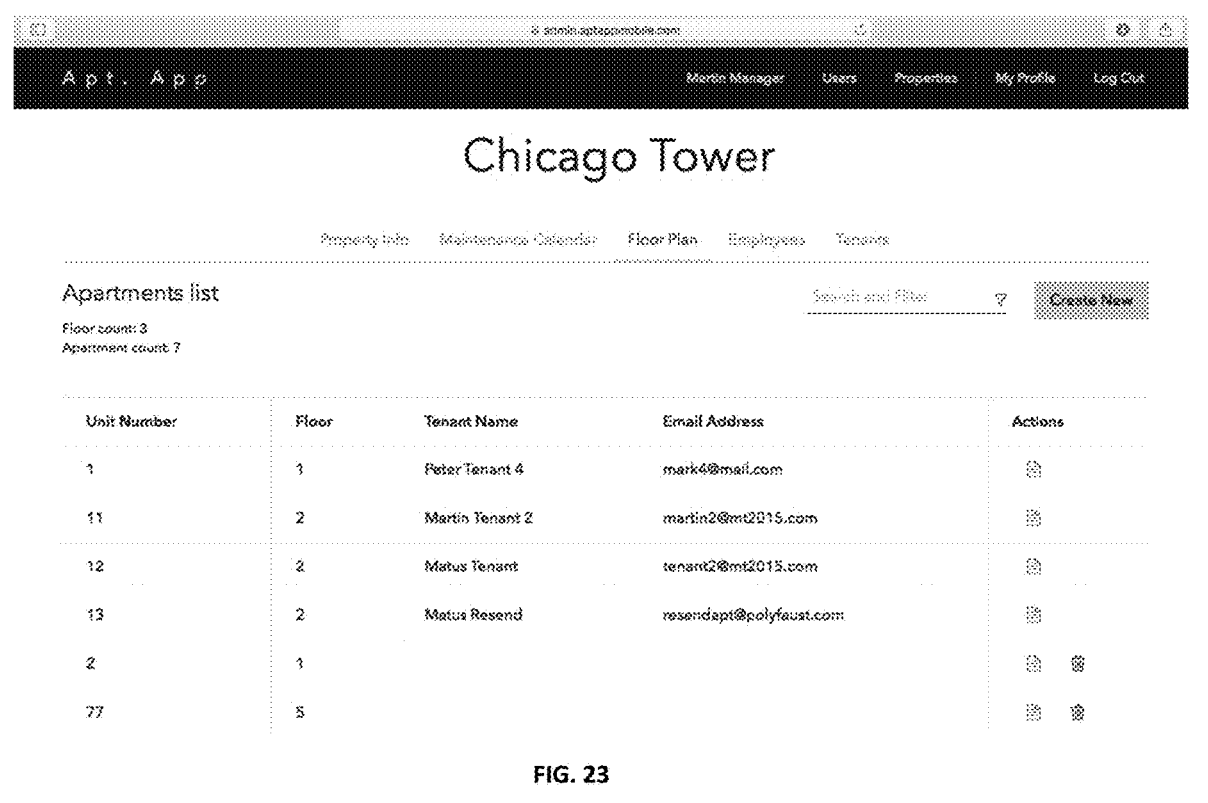
Figure 24:
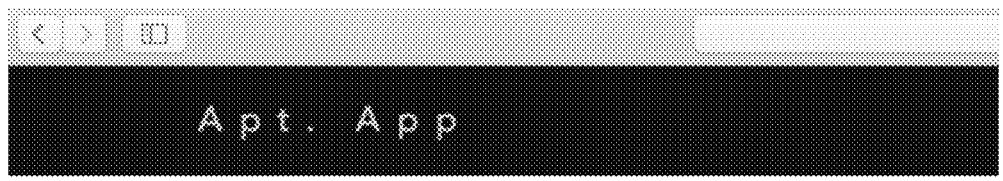
FIG. 24 illustrates an example of a graphical user interface for a computer display for property managers, including fillable-fields for associating adjacent apartment units with an apartment unit to create a mapping between apartment units, in accordance with various embodiments of the present disclosure.
Figure 25:
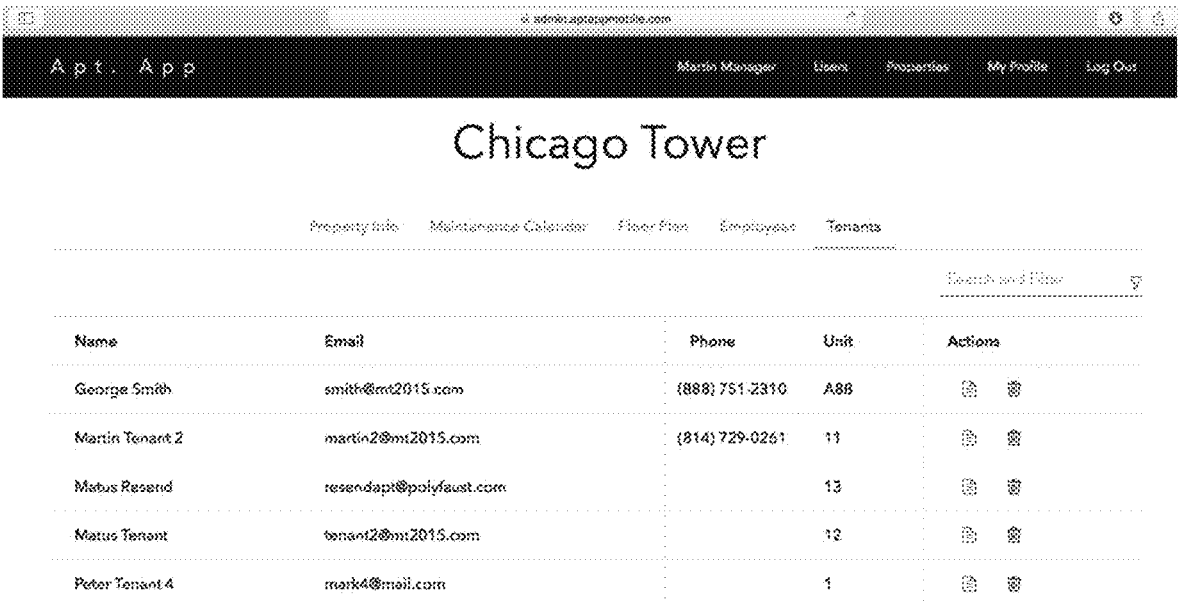
FIGS. 25-26 illustrate examples of graphical user interfaces for a computer display for property managers, including tenant contact information associated with apartment unit numbers, in accordance with various embodiments of the present disclosure.
Figure 26:
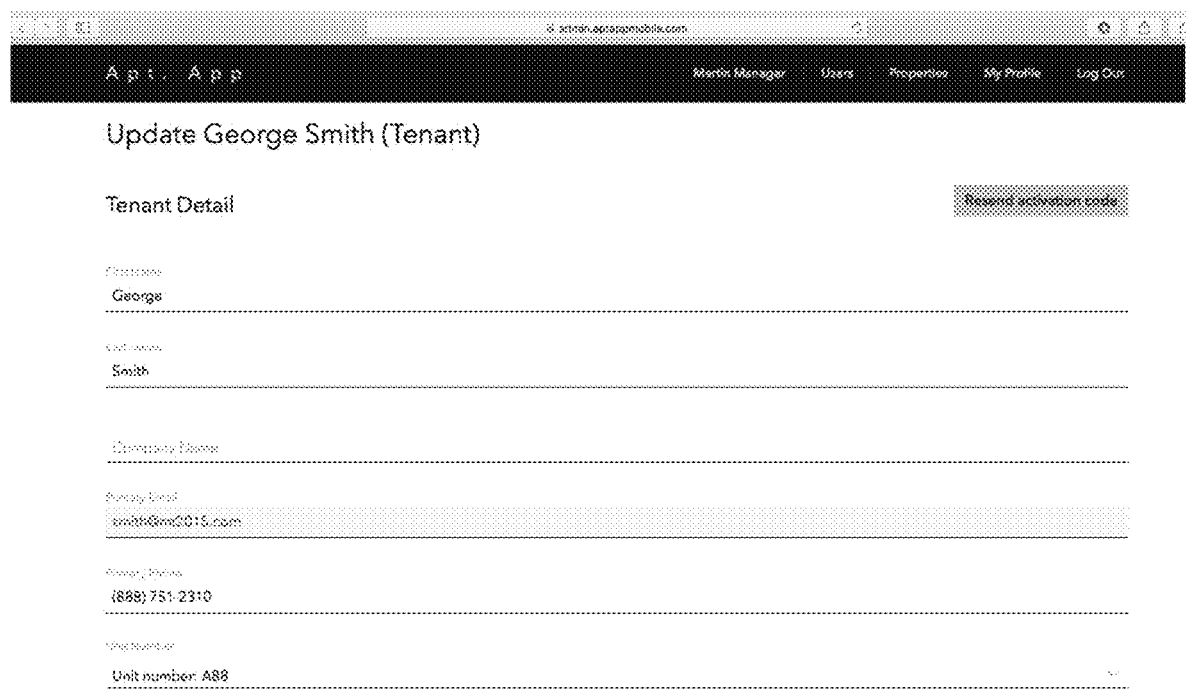

In FIGS. 23, 25 and 26, data may be stored with the email address, mobile phone, name and unit number for each tenant. For each unit, a mapping 350 may be maintained as shown in FIG. 24, with information/data fields indicating the unit numbers for the adjacent units, such as the unit to the left, to the right, above and below of the current tenant's unit. This information may be entered by an apartment manager or other person, stored in the database 18 (FIG. 1), and retrieved or accessed by the management module or communication engine 20 when a message is to be sent to a tenant from another tenant, as described with reference to operation 304 of FIG. 4. This information can also be used in conjunction with the graphical user interfaces of FIGS. 7-8.

The subject matter of this application may be practiced in a variety of embodiments as systems, devices, and other articles of manufacture or as methods. Embodiments may be implemented as hardware, software, computer readable media, or a combination thereof. The embodiments and functionalities described herein may operate via a multitude of computing systems including, without limitation, desktop computer systems, wired and wireless computing systems, mobile computing systems (e.g., mobile telephones, netbooks, tablets or slate type computers, notebook computers, and laptop computers), hand-held devices, multiprocessor systems, microprocessor-based or programmable consumer electronics, minicomputers, and mainframe computers.

User interfaces and information of various types may be displayed via on-board computing device displays or via remote display units associated with one or more computing devices. For example, user interfaces and information of various types may be displayed and interacted with. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 27:
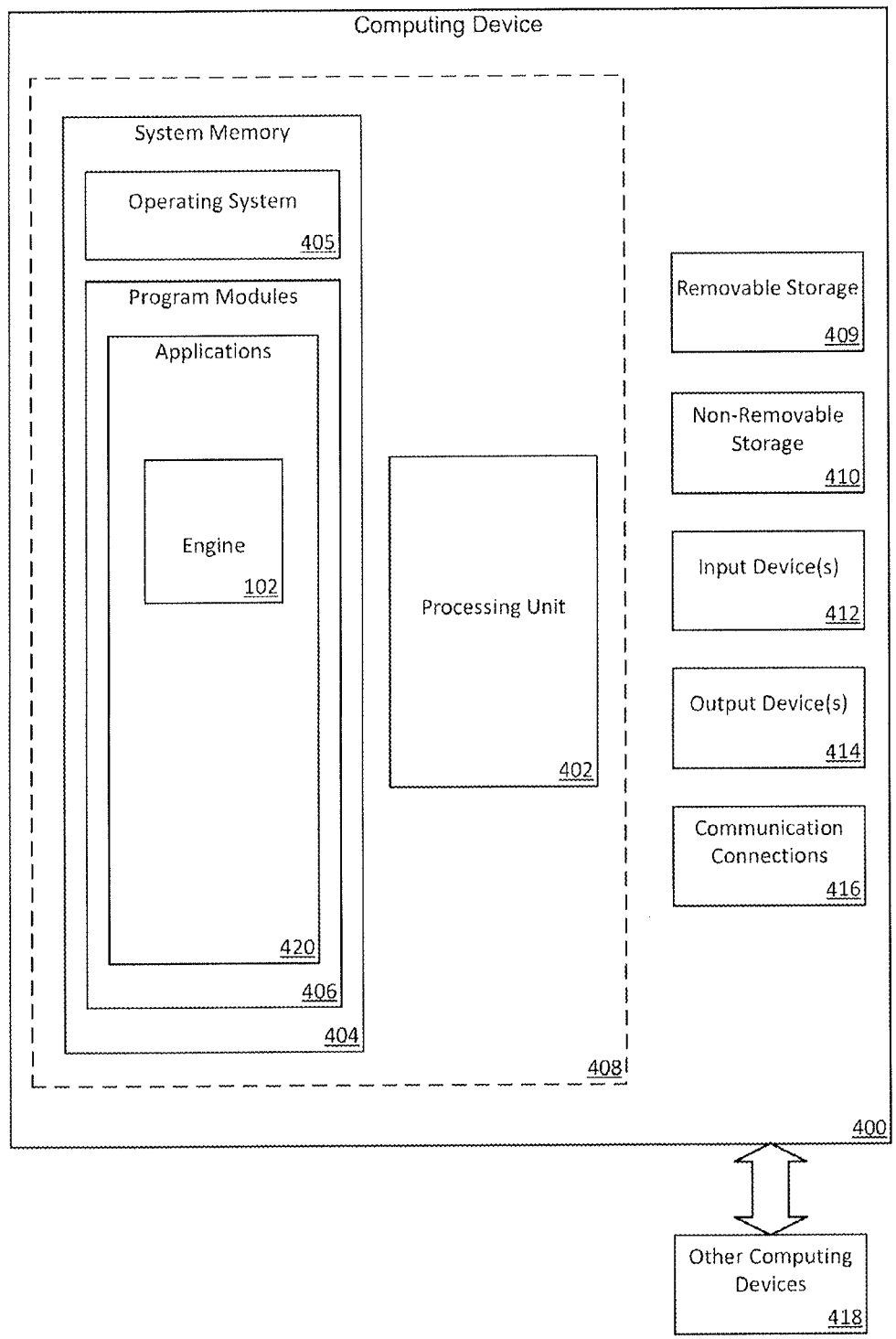
FIG. 27 illustrates a block diagram of an example of a computing device, in accordance with various embodiments of the present disclosure.

FIGS. 27-28 and the associated descriptions provide a discussion of a variety of operating environments in which embodiments of the invention may be practiced. However, the devices and systems illustrated and discussed are for purposes of example and illustration and are not limiting of a vast number of computing device configurations that may be utilized for practicing embodiments of the invention described above.

FIG. 27 is a block diagram illustrating physical components (i.e., hardware) of a computing device 400 with which embodiments of the invention may be practiced. The computing device components described below may be suitable for embodying computing devices including, but not limited to, a personal computer, a tablet computer, a surface computer, and a smart phone, or any other computing device discussed herein. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more computer program modules 406 suitable for running software applications 420 (which may be stored in system memory 404 and/or computer storage media) such as an engine 102 which may be configured implement one or more of the operations, features, processes or graphical user interface elements described herein (including those operations of communications engine 20, or one or more of the operations described herein such as FIGS. 2-4 and other Figures herein). For example, the operating system 405 may be suitable for controlling the operation of the computing device 400. Furthermore, embodiments of the invention may be practiced in conjunction with a graphics library, other operating systems, or any other application program and is not limited to any particular application or system. This basic configuration is illustrated by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated by a removable storage device 409 and a non-removable storage device 410.

As stated above, a number of program modules and data files may be stored in the system memory 404. While executing on the processing unit 402, the software applications 420 may perform processes including, but not limited to, one or more of the processes, steps, features or functions disclosed herein. Other program modules that may be used in accordance with embodiments of the present invention may include electronic mail applications, database applications, or other conventional applications.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the illustrated components may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein with respect to the software applications 420 may be operated via application-specific logic integrated with other components of the computing device 400 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all examples of computer storage media (i.e., memory storage). Computer storage media may include random access memory (RAM), read only memory (ROM), electrically erasable read-only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400.

Figure 28A:
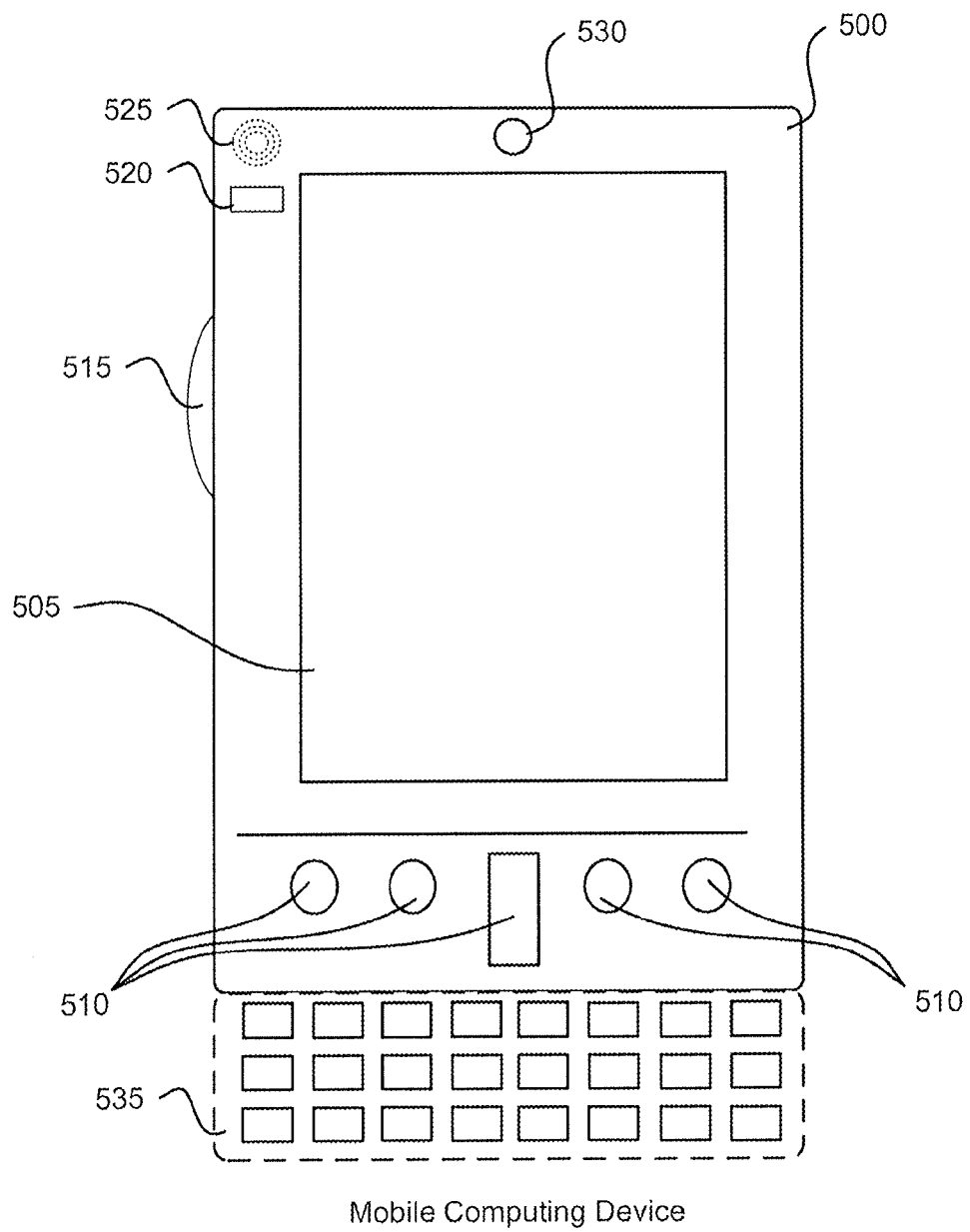
FIG. 28A illustrates an example of a mobile computing device.
Figure 28B:
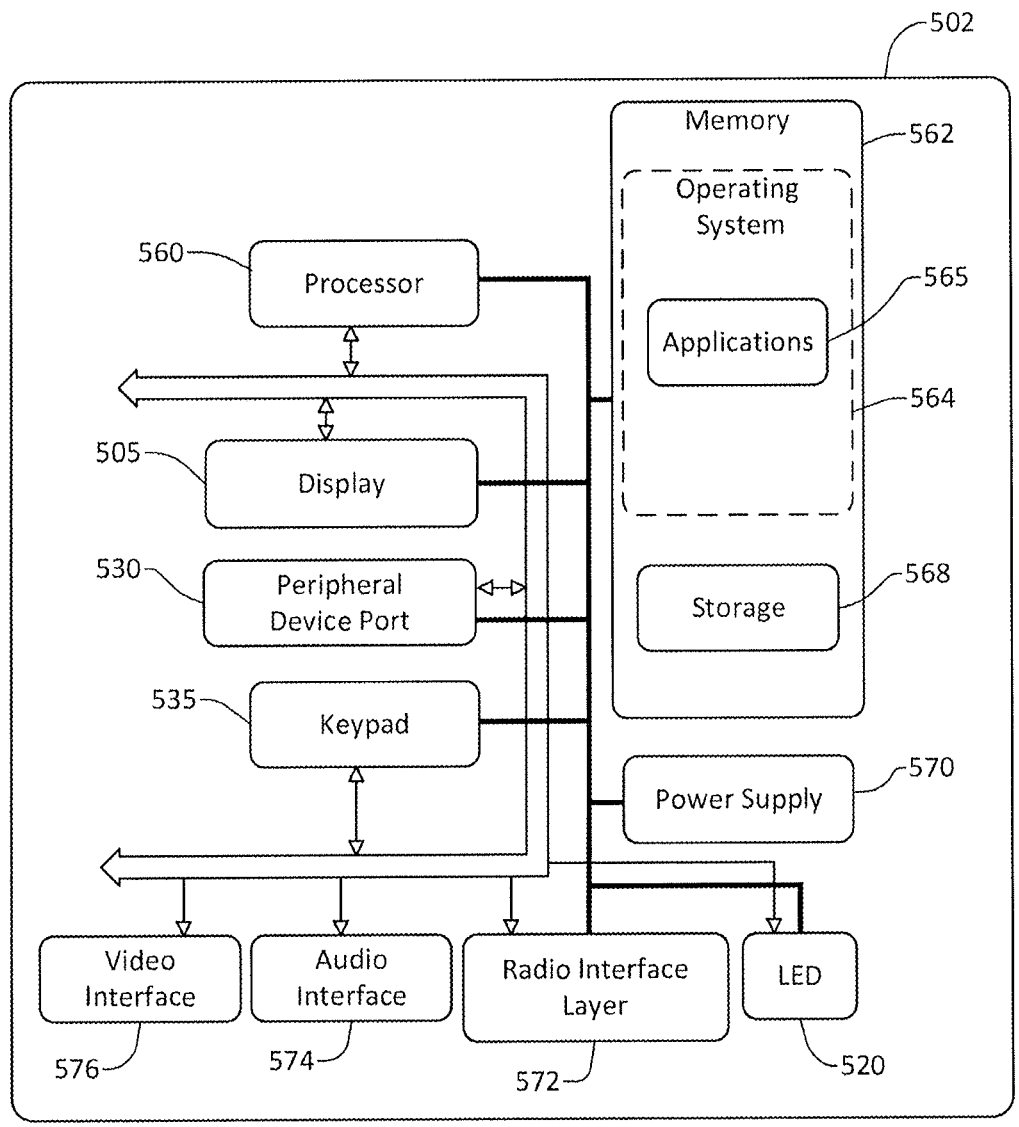
FIG. 28B illustrates a block diagram of an example of a mobile computing device, in accordance with various embodiments of the present disclosure.

FIGS. 28A and 28B illustrate a mobile computing device 500 with which embodiments of the invention may be practiced. Examples of suitable mobile computing devices include, but are not limited to, a mobile telephone, a smart phone, a tablet computer, a surface computer, and a laptop computer. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface, a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 28B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a smart phone capable of running one or more applications (e.g., browsers, e-mail clients, notes, contact managers, messaging clients, games, and media clients/players). In some embodiments, the system 502 is integrated as a computing device, such as an integrated personal digital assistant (PDA) and wireless phone.

One or more application programs 565 may be loaded into the memory 562 and run on or in association with the operating system 564. Examples of the application programs may include applications that are configured to perform one or more operations, steps, functions, features or graphical user interface items as described herein. Other applications 565 may include conventional applications such as phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 565 may use and store information in the non-volatile storage area 568, such as e-mail or other messages used by an e-mail application, and the like. A synchronization application (not shown) may also reside on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500, including software applications 420 described herein.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the function of transmitting and receiving radio frequency communications. The radio 572 facilitates wireless connectivity between the system 502 and the outside world via a communications carrier or service provider. Transmissions to and from the radio 572 are conducted under control of the operating system 564. In other words, communications received by the radio 572 may be disseminated to the application programs 565 via the operating system 564, and vice versa.

The visual indicator 520 may be used to provide visual notifications, and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video streams, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet (see, e.g., FIG. 1). As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

A server (such as but not limited to servicer 16 in FIG. 1) may provide software applications 420 to clients. As one example, the server may be a web server providing the software applications 420 over the web to client computing devices through a network such as the Internet. By way of example, a client computing device may be implemented as the computing device 400 and embodied in a personal computer 602a, a tablet computer 602b, and/or a mobile computing device (e.g., a smart phone) 602c. Any of these embodiments of the client device may obtain content from database 18, in one example, that may include various data items that may be stored or obtained as described herein.

Hence, as can be seen, embodiments of the present disclosure provide anonymous communications between tenants of an apartment complex, without the need for each tenant's mobile devices to maintain contact information for each of their neighbors. Embodiments of the present disclosure therefore provide an improvement in the operation of the mobile devices in terms of speed and a reduction in memory storage usage.

While the above has been described in terms of residential housing environments, it is understood that embodiments of the present disclosure may also be used for commercial tenants of office buildings, where each tenant could designate one or more contact persons to receive complaints and resolve such complaints.

While the methods disclosed herein have been described and shown with reference to particular operations performed in a particular order, it will be understood that these operations may be combined, sub-divided, or re-ordered to form equivalent methods without departing from the teachings of the present disclosure. Accordingly, unless specifically indicated herein, the order and grouping of the operations is not a limitation of the present disclosure.

It should be appreciated that reference throughout this specification to "one embodiment" or "an embodiment" or "one example" or "an example" means that a particular feature, structure or characteristic described in connection with the embodiment may be included, if desired, in at least one embodiment of the present disclosure. Therefore, it should be appreciated that two or more references to "an embodiment" or "one embodiment" or "an alternative embodiment" or "one example" or "an example" in various portions of this specification are not necessarily all referring to the same embodiment. Furthermore, the particular features, structures or characteristics may be combined as desired in one or more embodiments of the disclosure.

It should be appreciated that in the foregoing description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed inventions require more features than are expressly recited in each claim. Rather, inventive aspects lie in less than all features of a single foregoing disclosed embodiment, and each embodiment described herein may contain more than one inventive feature.

While the present disclosure has been particularly shown and described with reference to various embodiments thereof, it will be understood by those skilled in the art that various other changes in the form and details may be made without departing from the spirit and scope of the present disclosure.

The invention claimed is:

1. A computer-implemented method for anonymous communications between a first tenant computing device corresponding to a first tenant of an apartment complex residing in a first apartment unit, and other tenant computing devices corresponding to other tenants residing in other apartment units, comprising:
    storing in a database one or more items of contact information for the first tenant and other tenants;
    associating in the database the items of contact information of the first tenant to the first apartment unit;
    associating in the database one or more items of contact information of the other tenants to their respective apartment units;
    mapping the first apartment unit to one or more adjacent apartment units;
    providing to the first tenant computing device a graphical user interface with a list of messages for selection by the first tenant for transmission;
    providing to the first tenant computing device a graphical user interface with a selectable map of the one or more adjacent apartment units for selection by the first tenant to which the selected message is to be transmitted; and
    transmitting on an anonymous basis the selected message to the other tenant associated with the adjacent apartment unit selected by the first tenant.

2. The method of claim 1, wherein the adjacent apartment units include an apartment unit above the first apartment unit, an apartment unit below the first apartment unit, an apartment unit to the left of the first apartment unit, and an apartment unit to the right of the first apartment unit.

3. The method of claim 1, wherein the selectable map includes a graphical representation of an apartment unit above the first apartment unit, an apartment unit below the first apartment unit, an apartment unit to the left of the first apartment unit, and an apartment unit to the right of the first apartment unit.

4. The method of claim 1, wherein the selected message transmitted does not include any contact information of the first tenant.

5. The method of claim 1, wherein the list of messages includes predetermined fixed messages.

6. The method of claim 1, wherein the list of messages includes a message relating to noise issues.

7. The method of claim 1, wherein the items of contact information stored in the database include mobile phone numbers.

8. The method of claim 1, further comprising:
    providing in the tenant computing device a display of the selected message; and
    providing a list of response messages for selection by the other tenant.

9. The method of claim 1, further comprising:
    providing an activity log in the first tenant computing device with data relating to the transmitted message and a resolution status of the selected message.

10. The method of claim 1, further comprising:
    preventing, during a period of time, further transmissions of additional messages from the first tenant to the other tenant.

11. The method of claim 10, wherein the period of time is 15 minutes.

12. The method of claim 1, further comprising:
    notifying an apartment manager computing device of the selected message sent from the first tenant to the other tenant.

13. The method of claim 1, further comprising:
    detecting if multiple messages have been sent to a tenant with a predetermined time period, and if so, notifying an apartment manager computing device of the multiple messages.

14. The method of claim 13, wherein the time period is 24 hours.

15. A system for anonymous communications between tenants in an apartment complex, comprising:
    a communications engine operating on a server;
    a database coupled with the server, the database including contact information a respective apartment unit number relating to each tenant of the apartment complex;
    an interface operating on mobile computing device of a first tenant, the interface including a graphical user interface with a list of messages for selection by the first tenant for transmission and a selectable map of the one or more adjacent apartment units for selection by the first tenant to which the selected message is to be transmitted on an anonymous basis.

16. The system of claim 15, wherein the list of messages includes predetermined fixed messages.

17. The system of claim 15, wherein the selectable map includes a graphical representation of an apartment unit above the first apartment unit, an apartment unit below the first apartment unit, an apartment unit to the left of the first apartment unit, and an apartment unit to the right of the first apartment unit.

18. The system of claim 15, wherein the communications engine prevents, during a period of time, further transmissions of additional messages from the first tenant to another tenant.

19. A non-transitory computer storage media used for providing anonymous communications between tenants of an apartment complex, comprising:
    a module for providing a graphical user interface with a display of a plurality of adjacent apartment units for a user to select;
    a module for providing a graphical user interface with a display of a plurality of fixed messages for transmission to one or more tenants associated with a selected adjacent apartment unit; and
    a module for transmitting on an anonymous basis a selected message to a tenant associated with an adjacent apartment unit selected by the user.

* * * * *